(12) United States Patent  
Wang et al.

(10) Patent No.: US 11,706,113 B2  
(45) Date of Patent: Jul. 18, 2023

(54) DETERMINING DELAY BASED ON A MEASUREMENT CODE BLOCK

(71) Applicant: HUAWEI TECHNOLOGIES CO., LTD., Guangdong (CN)

(72) Inventors: Renlei Wang, Shenzhen (CN); Zhe Lou, Munich (DE); Min Zha, Shenzhen (CN); Zhigang Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 17/159,785

(22) Filed: Jan. 27, 2021

(65) Prior Publication Data

US 2021/0152451 A1     May 20, 2021

Related U.S. Application Data

(63) Continuation of application No. PCT/CN2019/098205, filed on Jul. 29, 2019.

(30) Foreign Application Priority Data

Aug. 24, 2018 (CN) ......................... 201810974558.8

(51) Int. Cl.  
    *H04L 43/0852*     (2022.01)  
    *H04L 1/00*     (2006.01)  
    (Continued)

(52) U.S. Cl.  
    CPC ........ *H04L 43/0852* (2013.01); *H04L 1/0057* (2013.01); *H04L 12/40136* (2013.01); *H04L 43/026* (2013.01); *H04L 47/283* (2013.01)

(58) Field of Classification Search  
CPC .............. H04L 43/0852; H04L 1/0057; H04L 12/40136; H04L 43/026; H04L 47/283; H04L 41/142; H04L 43/0858; H04L 43/08  
See application file for complete search history.

(56) References Cited

U.S. PATENT DOCUMENTS 9,118,728 B2 *   8/2015   Diab ..................... H04L 69/323  
10,051,006 B2     8/2018   Register et al.  
(Continued)

FOREIGN PATENT DOCUMENTS

CN     102111380 A     6/2011  
CN     102932905 A     2/2013  
(Continued)

OTHER PUBLICATIONS

Extended European Search Report issued in European Application No. 19851563.7 dated Jul. 9, 2021, 10 pages.  
(Continued)

*Primary Examiner* — Benjamin H Elliott, IV  
(74) *Attorney, Agent, or Firm* — Fish & Richardson P.C.

(57) ABSTRACT

This application provides an example delay measurement method and an example network device. The method includes receiving, by a first network device, a first service flow. The method also includes determining, by the first network device, a first delay value based on a first measurement code block in the first service flow. The first delay value is a time difference between a first moment at which the first measurement code block is detected in the first network device and a second moment at which the first measurement code block is detected in the first network device.

20 Claims, 21 Drawing Sheets

(51) Int. Cl.
  *H04L 43/026* (2022.01)
  *H04L 47/283* (2022.01)
  *H04L 12/40* (2006.01)

(56) References Cited

U.S. PATENT DOCUMENTS

| | | | | |
|---|---|---|---|---|
| 2007/0116055 | A1* | 5/2007 | Atsumi | H04J 3/1658 370/476 |
| 2008/0075121 | A1* | 3/2008 | Fourcand | H04J 3/0682 370/503 |
| 2009/0232133 | A1* | 9/2009 | Yu | H04J 3/047 370/389 |
| 2010/0077276 | A1* | 3/2010 | Okamura | H04L 1/0072 714/752 |
| 2010/0215007 | A1* | 8/2010 | Zhang | H04L 5/0007 370/329 |
| 2010/0228872 | A1* | 9/2010 | Diab | H04L 69/323 709/230 |
| 2010/0246604 | A1* | 9/2010 | Kim | H04L 5/0053 370/464 |
| 2011/0305458 | A1* | 12/2011 | Zhou | H04J 3/1694 398/66 |
| 2014/0092918 | A1* | 4/2014 | Jost | H04J 3/0661 370/465 |
| 2014/0173143 | A1* | 6/2014 | Li | H04L 25/49 710/29 |
| 2014/0195788 | A1* | 7/2014 | Kalogeropulos | G06F 9/3802 712/237 |
| 2015/0207712 | A1* | 7/2015 | Fang | H04L 43/0852 370/252 |
| 2015/0334666 | A1* | 11/2015 | Griffioen | H04W 56/002 370/350 |
| 2015/0350046 | A1* | 12/2015 | Thapliya | H04L 43/0894 709/224 |
| 2016/0226758 | A1* | 8/2016 | Ashwood-Smith | H04L 41/342 |
| 2016/0227505 | A1* | 8/2016 | Loehr | H04L 69/323 |
| 2016/0352500 | A1* | 12/2016 | Benjamini | H04L 7/0012 |
| 2017/0005901 | A1* | 1/2017 | Gareau | H04L 43/10 |
| 2017/0093757 | A1* | 3/2017 | Gareau | H04J 3/065 |
| 2017/0222838 | A1* | 8/2017 | Petrov | H04L 27/2649 |
| 2017/0324778 | A1* | 11/2017 | Register | H04L 43/106 |
| 2018/0248797 | A1* | 8/2018 | Kim | H04L 12/42 |
| 2019/0044650 | A1* | 2/2019 | Khan | H04L 7/00 |
| 2020/0220650 | A1* | 7/2020 | Cheng | H04L 41/04 |
| 2020/0252488 | A1* | 8/2020 | Zha | H04L 12/2863 |
| 2020/0322246 | A1* | 10/2020 | Wang | H04L 43/0858 |
| 2021/0152451 | A1* | 5/2021 | Wang | H04L 12/40136 |

FOREIGN PATENT DOCUMENTS

| | | |
|---|---|---|
| CN | 103457793 A | 12/2013 |
| CN | 103716147 A | 4/2014 |
| CN | 103857029 A | 6/2014 |
| CN | 104067653 A | 9/2014 |
| CN | 104812054 A | 7/2015 |
| CN | 105978759 A | 9/2016 |
| CN | 106161121 A | 11/2016 |
| CN | 106454921 A | 2/2017 |
| CN | 107979421 A | 5/2018 |
| CN | 108289015 A | 7/2018 |
| EP | 2296396 A1 | 3/2011 |
| WO | 2017026687 A1 | 2/2017 |

OTHER PUBLICATIONS

Office Action issued in Chinese Application No. 201810974558.8 dated Aug. 10, 2021, 19 pages (with English translation).

Xu, "Research and Validation on Key Technology of Time and Frequency Synchronization in Co-time Co-frequency Full-duplex Microwave Communication Systems," University of Electronic Science and Technology, Issue 02, Feb. 2017, 2 pages (with English abstract).

Zhang et al., "Measurement and Modeling of Delays in Wide-Area Closed-Loop Control Systems," IEEE Transactions on Power Systems, vol. 30, No. 5, Sep. 2015, 8 pages.

PCT International Search Report and Written Opinion issued in International Application No. PCT/CN2019/098205 dated Oct. 17, 2019, 11 pages (partial English translation).

Office Action issued in Chinese Application No. 201810974558.8 dated Feb. 7, 2021, 9 pages.

* cited by examiner

DETERMINING DELAY BASED ON A MEASUREMENT CODE BLOCK

CROSS-REFERENCE TO RELATED APPLICATIONS

This application is a continuation of International Application No. PCT/CN2019/098205, filed on Jul. 29, 2019, which claims priority to Chinese Patent Application No. 201810974558.8, filed on Aug. 24, 2018. The disclosures of the aforementioned applications are hereby incorporated by reference in their entireties.

TECHNICAL FIELD

This application relates to the field of information technologies, and more specifically, to a delay measurement method and a network device.

BACKGROUND

A virtual interleaving sublayer (VIS) technology is a time-division multiplexing technology below a media access control (MAC) layer, and a channel below the MAC layer is time-slotted. After being time-slotted, the time-slotted channel can be used to transmit a low-speed industrial Ethernet service. However, time-slotting leads to a common problem of one-way delay uncertainty, to be specific, a random relationship between a service arrival moment and a transmission timeslot moment, and consequently, a service delay is undetermined.

When a service is mapped to a timeslot at a VIS, delay uncertainty is introduced in both service mapping and egress buffering. As a quantity of cascaded devices increases, nondeterministic delays accumulate, and consequently, communication efficiency is reduced.

SUMMARY

This application provides a delay calculation and compensation method and apparatus, so that a delay value of a service flow can be determined by measuring a delay value of a measurement code block in the service flow.

According to a first aspect, a delay measurement method is provided, where the method includes:

receiving, by a first network device, a first service flow; and determining, by the first network device, a first delay value based on a first measurement code block in the first service flow, where the first delay value is a time difference between a first moment at which the first measurement code block is detected in the first network device and a second moment at which the first measurement code block is detected in the first network device.

In the technical solution of this embodiment of this application, a delay value of a service flow can be determined by measuring a delay value of a measurement code block in the service flow.

It should be noted that, in this embodiment of this application, the first network device may be configured to connect a first client device and a second client device, and the first client device and the second client device may be connected by using at least one network device.

For example, for an industrial Ethernet, the first client device may be a control device, and the second client device may be an input/output device. In addition, the first client device and the second client device may be alternatively client devices in a flexible Ethernet.

It should be understood that, in this embodiment of this application, the first network device may be located in different locations.

For example, the first network device may be a network device connected to a control device, may be a network device connected to an input/output device, or may be a network device connected to an intermediate network device.

With reference to the first aspect, in some implementations of the first aspect, the method further includes:

receiving, by the first network device, a second service flow, where a transmission direction of the second service flow is opposite to a transmission direction of the first service flow, and the second service flow and the first service flow belong to a same service; and determining, by the first network device, a second delay value based on a second measurement code block in the second service flow, where the second delay value is a time difference between a first moment at which the second measurement code block is detected in the first network device and a second moment at which the second measurement code block is detected in the first network device.

It should be understood that for a method for determining the second delay value based on the second measurement code block, refer to a method for determining the first delay value based on the first measurement code block. The two methods have similar specific processes.

With reference to the first aspect, in some implementations of the first aspect, the method further includes:

sending, by the first network device, at least one of the first delay value and the second delay value to the transmission direction of the first service flow or the transmission direction of the second service flow.

In the technical solution of this embodiment of this application, the first network device may determine an uplink delay value and a downlink delay value by using a measurement code block, thereby compensating for time based on the delay values.

For example, the first delay value may be a delay value of an uplink, the second delay value may be a delay value of a downlink, and the first network device may send an uplink delay value and a downlink delay value of the first network device to an uplink client device, or may send an uplink delay value and a downlink delay value of the first network device to a downlink client device, so that the client device compensates for time.

For example, the first delay value may be a delay value of an uplink, the second delay value may be a delay value of a downlink, and the first network device may send an uplink delay value and a downlink delay value of the first network device to an uplink edge network device, or may send an uplink delay value and a downlink delay value of the first network device to a downlink edge network device, so that the edge network device compensates for time.

It should be understood that, when the first client and the second client are connected by using a plurality of network devices, each network device may send an uplink delay value and a downlink delay value to the client device, so that the client device or the edge network device compensates for time.

It should be understood that, in this embodiment of this application, the first service flow may be a downlink service flow, that is, a service flow sent by the first client device to the second client device by using the first network device, and the second service flow may be an uplink service flow, that is, a service flow sent by the second client device to the first client device by using the first network device. It should be further understood that, for the method for determining the second delay value in this embodiment of this application, refer to the method for determining the first delay value.

It should be noted that the downlink first service flow and the uplink second service flow belong to a same service, and the first service flow and the second service flow are connected to a same device. A device that sends the first service flow is also used as a device that receives the second service flow. A device that sends the second service flow is also used as a device that receives the first service flow.

With reference to the first aspect, in some implementations of the first aspect, the determining, by the first network device, a first delay value based on a first measurement code block in the first service flow includes:

when the first network device is a first network device in the transmission direction of the first service flow, setting, by the first network device, the first measurement code block in the first service flow; and determining, by the first network device, the first delay value based on the first measurement code block.

For example, for a downlink, when the first network device may be the first network device in the transmission direction of the first service flow, in other words, when the first network device may be a network device connected to a control device, the first network device sets the first measurement code block in the received first service flow sent by the control device.

For example, for an uplink, when the first network device may be a first network device in the transmission direction of the second service flow, in other words, when the first network device may be a network device connected to an input/output device, the first network device sets the first measurement code block in the received first service flow sent by the input/output device.

It should be understood that setting the first measurement code block in the first service flow may be inserting the first measurement code block into the first service flow or adding the first measurement code block to the first service flow. The first measurement code block may be a multiplexed idle-state code block. Specifically, a preset value may be set in the idle-state code block to generate the first measurement code block.

With reference to the first aspect, in some implementations of the first aspect, the setting, by the first network device, the first measurement code block in the first service flow includes:

when the first network device receives a first instruction, setting, by the first network device, the first measurement code block in the first service flow, where the first instruction is used to instruct to measure a delay value of the first service flow.

For example, for a downlink, when the first network device is a network device connected to the first client device, for example, when receiving a first instruction sent by a control device, the first network device sets the first measurement code block in the first service flow.

For example, for an uplink, when the first network device is a network device connected to the second client device, for example, when receiving a first instruction sent by an output/output device, the first network device sets the first measurement code block in the first service flow.

With reference to the first aspect, in some implementations of the first aspect, the determining, by the first network device, a first delay value based on a first measurement code block in the first service flow includes:

when the first network device is not a first network device in the transmission direction of the first service flow, receiving, by the first network device, the first service flow including the first measurement code block; and determining, by the first network device, the first delay value based on the first measurement code block.

It should be understood that, when the first network device is not the first network device in the transmission direction of the first service flow, the first network device transparently transmits the first service flow including the first measurement code block. In this case, the first network device may be a network device connected to an intermediate network device, or the first network device may be a last network device in the transmission direction of the first service flow.

For example, for a downlink, when the first network device is not the first network device in the transmission direction of the first service flow, the first network device may be a network device connected to the intermediate network device, or the first network device may be a network device connected to the input/output device.

For example, for an uplink, when the first network device is not the first network device in the transmission direction of the first service flow, the first network device may be a network device connected to the intermediate network device, or the first network device may be a network device connected to the control device.

With reference to the first aspect, in some implementations of the first aspect, the method further includes:

recording, by the first network device, the first moment when the first network device detects the first measurement code block in the first service flow before writing the first service flow into a cache;

recording, by the first network device, the second moment when the first network device detects the first measurement code block when reading the first service flow from the cache; and determining, by the first network device, the first delay value based on the first moment and the second moment.

For example, when the first network device is the first network device in the transmission direction of the first service flow, the first network device records the first moment when writing the first service flow including the first measurement code block into the cache; when a sending timeslot of the first service flow arrives, the first network device detects the first measurement code block when reading the first service flow in the cache, and records the second moment; and the first network device determines the first delay value based on the first moment and the second moment.

For example, for a downlink, when the first network device may be a network device connected to the control device, the first network device records the first moment when writing the first service flow including the first measurement code block into the cache; when a sending timeslot of the first service flow arrives, the first network device reads the first service flow from the cache; the first network device records the second moment when detecting the first measurement code block, and the first network device determines the first delay value based on the first moment and the second moment. The first delay value is a delay value of the first service flow in the first network device.

For example, for an uplink, when the first network device may be a network device connected to the input/output device, the first network device records the first moment when writing the first service flow including the first measurement code block into the cache; when a sending timeslot of the first service flow arrives, the first network device reads the first service flow from the cache; the first network device records the second moment when detecting the first measurement code block, and the first network device determines the first delay value based on the first moment and the second moment. The first delay value is a delay value of the first service flow in the first network device.

It should be understood that, for an industrial Ethernet, the first client device may be a control device, and the second client device may be an input/output device. In addition, the first client device and the second client device may be alternatively client devices in a flexible Ethernet.

For example, when the first network device is not the first network device in the transmission direction of the first service flow, the first network device receives the first service flow including the first measurement code block; records the first moment when the first network device detects the first measurement code block; records the second moment when the first network device detects the first measurement code block in an egress service data flow; and determines the first delay value based on the first moment and the second moment.

It should be understood that the first network device that determines the first delay value based on the first moment and the second moment is a network device that transparently transmits the first service flow including the measurement code block. In this case, the first service flow received by the first network device includes the measurement code block, and the measurement code block is set in the first service flow by the first network device in the transmission direction of the first service flow.

With reference to the first aspect, in some implementations of the first aspect, after recording the second moment, the method further includes:

deleting, by the first network device, the first measurement code block.

For example, when the first network device is a last network device in the transmission direction of the first service flow, after recording the second moment, the first network device may delete the first measurement code block in the first service flow, and send the first service flow to a client device.

With reference to the first aspect, in some implementations of the first aspect, the first measurement code block and the second measurement code block are coded blocks with identification information, the first measurement code block is carried in the first service flow, and the second measurement code block is carried in the second service flow.

It should be understood that the first measurement code block and the second measurement code block may be control code blocks, and an encoding manner of the first measurement code block and the second measurement code block is consistent with an encoding manner of a service, and is identified by using unique identifiable code. The coded block may be divided into two parts: code that is a type of data encapsulation, such as an 8b/10b encoding manner; and coded data that may be referred to as a coded block or may be referred to as a code block.

For example, the measurement code block may be alternatively generated by setting a preset value in an idle-state code block.

With reference to the first aspect, in some implementations of the first aspect, the method further includes:

generating, by the first network device, a first code group based on the first delay value and the second delay value, where the first code group includes information about an uplink-downlink identifier, information about the first delay value, and information about the second delay value, and the uplink-downlink identifier is used to indicate that the first delay value and the second delay value are respectively an uplink delay value and a downlink delay value.

With reference to the first aspect, in some implementations of the first aspect, the first code group includes one or more coded blocks.

It should be understood that the first code group may be one or more coded blocks. When the first code group is one coded block, the coded block includes the information about the uplink-downlink identifier, the information about the first delay value, and the information about the second delay value. When the first code group is a plurality of coded blocks, the information about the uplink-downlink identifier, the information about the first delay value, and the information about the second delay value may be separately carried in different coded blocks in the first code group.

With reference to the first aspect, in some implementations of the first aspect, the method further includes:

generating, by the first network device, the first code group based on the first delay value and the second delay value, where the first code group includes a coded block with a first identifier, a coded block carrying the first delay value, a coded block with a second identifier, and a coded block carrying the second delay value, the coded block with the first identifier is used to indicate that the first delay value is an uplink delay value or a downlink delay value, and the coded block with the second identifier is used to indicate that the second delay value is an uplink delay value or a downlink delay value.

It should be noted that a code block with the first identifier and a code block with the second identifier may be control code blocks, and are used to indicate whether a delay value carried by a subsequent code block is an uplink delay value or a downlink delay value.

With reference to the first aspect, in some implementations of the first aspect, the method further includes:

sending, by the first network device, the first code group to a client device, where the first code group includes an uplink delay value and a downlink delay value.

It should be understood that, in this embodiment of this application, the two delay values determined for the uplink and the downlink may be separately encoded into code groups, and the code groups are inserted into both the uplink service flow and the downlink service flow as padding code blocks, and transmitted to the edge network device or the client device.

For example, an uplink delay identifier code block and a downlink delay identifier code block may be control code blocks. In the code group, two 8B9B code blocks may be used as one group, and a first code block is a control code block, to indicate that a delay measurement value is transmitted in a subsequent control block. 0x0XX may be used to represent a data code block, 0x155 may be used to represent the uplink delay identifier code block, 0x1AA may be used to represent the downlink delay identifier code block, and 0x1XX may be used to represent a delay value.

It should be noted that, in this embodiment of this application, the first network device determines a delay value, and transmits the delay value by using a code group, so that the delay value can be transmitted to the client device or the edge network device; and the client device or the edge network device compensates for time.

For example, the first network device sends the code group to the client device, and the code group may include an uplink delay value and a downlink delay value of the first service flow in the first network device, to compensate for delays of the uplink and the downlink, thereby reducing a time synchronization error.

For example, descriptions are provided by using an example in which the first client device (for example, the control device) and the second client device (the input/output device are connected by using two network devices, and the control device compensates for time.

A device 1 transmits a locally calculated DL1 and UL2 and UL1 and DL2 of a device 2 that are parsed from an uplink data flow to the control device, and the control device obtains four delay values: DL1, DL2, UL1, and UL2. The control device performs calculation as follows: Downlink delay=DL1+DL2; Uplink delay=UL1+UL2. When sending a time deviation adjustment command to the input/output (IO) device, the control device (a PLC) takes an uplink-downlink delay deviation into consideration.

With reference to the first aspect, in some implementations of the first aspect, the method further includes:

sending, by the first network device, the first code group to an edge network device, where the first code group includes an uplink delay value and a downlink delay value, and the edge network device is a network device connected to the client device.

For example, it is assumed that the first client device and the second client device are connected by using a device 1, a device 2, and a device 3. For a downlink, the device 1 transmits DL1 (representing a downlink delay value of the device 1) to the device 3, and the device 2 transmits DL2 to the device 3. The device 3 receives the DL1 and the DL2 and may determine a downlink delay DL1+DL2+DL3 based on DL3 determined by the device 3. In addition, the device 1 may also obtain the DL2 and the DL3. For an uplink, the device 3 transmits UL3 (representing an uplink delay value of the device 3) to the device 1, and the device 2 transmits UL2 to the device 1. The device 1 receives the UL3 and the UL2 and may determine an uplink delay UL1+UL2+UL3 based on UL1 determined by the device 1. In addition, the device 3 may also obtain the UL2 and the UL1.

For example, descriptions are provided by using an example in which the first client device and the second client device are connected by using three network devices, and the edge network device compensates for time. The device 1 and the device 3 perform calculation and compensation as follows:

If DL1+DL2+DL3>UL1+UL2+UL3, an uplink delay, to be specific, a read/write address of an asymmetric delay compensation cache of a control device 1, needs to be increased, so that the uplink delay is increased by DL1+DL2+DL3−UL1−UL2−UL3. The device 3 does not need to compensate for a delay.

If DL1+DL2+DL3<UL1+UL2+UL3, a downlink delay, to be specific, a read/write address of an asymmetric delay compensation cache of a control device 3, needs to be increased, so that the uplink delay is increased by UL1+UL2+UL3−DL1−DL2−DL3. The device 1 does not need to compensate for a delay.

If DL1+DL2+DL3=UL1+UL2+UL3, an uplink delay, and a downlink delay are equal and symmetric, and neither the device 1 nor the device 2 needs to perform compensation.

In the technical solution of this embodiment of this application, a delay value of an entire service can be determined by using a delay value of a measurement code block. A problem in a time-slotting technology that an error is introduced into time synchronization because an uplink delay and a downlink delay are asymmetric is resolved. An uplink delay value and a downlink delay value are determined, and the uplink delay value and the downlink delay value are used to compensate for time, so that the problem that the uplink delay and the downlink delay are asymmetric is alleviated, thereby reducing a time synchronization error.

It should be understood that the device 1, the device 2, and the device 3 may be any network device that time-slots a service flow transmission channel.

For example, the device 1, the device 2, and the device 3 may be virtual interleaving sublayer (VIS) devices.

According to a second aspect, a network device is provided, where the network device is a first network device and includes:

a communications module configured to receive a first service flow; and a processing module configured to determine a first delay value based on a first measurement code block in the first service flow, where the first delay value is a time difference between a first moment at which the first measurement code block is detected in the first network device and a second moment at which the first measurement code block is detected in the first network device.

With reference to the second aspect, in some implementations of the second aspect, the communications module is further configured to: receive a second service flow, where a transmission direction of the second service flow is opposite to a transmission direction of the first service flow, and the second service flow and the first service flow belong to a same service; and the processing module is further configured to determine a second delay value based on a second measurement code block in the second service flow.

With reference to the second aspect, in some implementations of the second aspect, the communications module is further configured to:

send at least one of the first delay value and the second delay value to the transmission direction of the first service flow or the transmission direction of the second service flow.

With reference to the second aspect, in some implementations of the second aspect, the communications module is further configured to:

the processing module is specifically configured to:

when the network device is a first network device in the transmission direction of the first service flow, set the first measurement code block in the first service flow; and determine the first delay value based on the first measurement code block.

With reference to the second aspect, in some implementations of the second aspect, the communications module is further configured to:

the processing module is specifically configured to when the first network device receives a first instruction, set the first measurement code block in the first service flow, where the first instruction is used to instruct to measure a delay value of the first service flow.

With reference to the second aspect, in some implementations of the second aspect, the communications module is further configured to:

the processing module is specifically configured to when the first network device is not a first network device in the transmission direction of the first service flow; receive, by using the communications module, the first service flow including the first measurement code block; and determine the first delay value based on the first measurement code block.

With reference to the second aspect, in some implementations of the second aspect, the processing module is further configured to:

record the first moment when the first measurement code block is detected in the first service flow before the first service flow is written into a cache;

record the second moment when the first measurement code block is detected when the first service flow is read from the cache; and determine the first delay value based on the first moment and the second moment.

With reference to the second aspect, in some implementations of the second aspect, the processing module is further configured to:

delete the first measurement code block.

With reference to the second aspect, in some implementations of the second aspect, the first measurement code block and the second measurement code block are coded blocks with identification information, the first measurement code block is carried in the first service flow and the second measurement code block is carried in the second service flow.

With reference to the second aspect, in some implementations of the second aspect, the processing module is further configured to:

generate a first code group based on the first delay value and the second delay value, where the first code group includes information about an uplink-downlink identifier, information about the first delay value, and information about the second delay value, and the uplink-downlink identifier is used to indicate that the first delay value and the second delay value are respectively an uplink delay value and a downlink delay value.

With reference to the second aspect, in some implementations of the second aspect, the first code group includes one or more coded blocks.

With reference to the second aspect, in some implementations of the second aspect, the processing module is further configured to:

generate the first code group based on the first delay value and the second delay value, where the first code group includes a coded block with a first identifier, a coded block carrying the first delay value, a coded block with a second identifier, and a coded block carrying the second delay value, the coded block with the first identifier is used to indicate that the first delay value is an uplink delay value or a downlink delay value, and the coded block with the second identifier is used to indicate that the second delay value is an uplink delay value or a downlink delay value.

With reference to the second aspect, in some implementations of the second aspect, the communications module is further configured to:

send the first code group to a client device, where the first code group includes an uplink delay value and a downlink delay value; or send the first code group to an edge network device, where the first code group includes an uplink delay value and a downlink delay value, and the edge network device is a network device connected to the client device.

According to a third aspect, a network device is provided, where the network device includes: a memory, configured to store a computer program; and a processor, configured to execute the computer program stored in the memory, so that the network device performs the method in any one of the first aspect or the possible implementations of the first aspect.

According to a fourth aspect, a system is provided, where the system includes the network device in any one of the second aspect or the possible implementations of the second aspect.

According to a fifth aspect, an embodiment of this application provides a computer-readable storage medium, and the computer-readable storage medium stores an instruction for implementing the method in any one of the first aspect or the possible implementations of the first aspect.

According to a sixth aspect, this application provides a computer program product including an instruction, and when the computer program product runs on a computer, the computer performs the method in any one of the first aspect or the possible implementations of the first aspect.

DESCRIPTION OF EMBODIMENTS

The following describes technical solutions of this application with reference to the accompanying drawings.

For a better understanding of a delay measurement method in the embodiments of this application, the following briefly describes some related basic concepts.

Reconciliation sublayer (RS): A main function of the reconciliation sublayer is to provide a signal mapping mechanism between a media independent interface (MII) and a media access control (media access control, MAC) layer.

MAC layer: A main function of the MAC layer is to form a frame by using bitstreams "0" and "1" at a physical layer and to check an error by using error check information at a frame tail.

MAC sublayer: A main function of the MAC sublayer is to add a physical address of a target computer to a data frame; when the data frame is transmitted to a peer-end MAC layer, the MAC layer checks whether this address matches an address of the MAC layer; and when the address in the frame does not match the address of the MAC layer, the MAC layer discards the frame; or when the address in the frame matches the address of the MAC layer, the MAC layer sends the frame to an upper layer.

xMII interface: The xMII interface is defined as a general name of various Ethernet port rates or MII interface types of various versions.

For example, a 100 M Ethernet is referred to as an MII, a simplified version of the MII is an RMII (reduced MII), a serial MII is an SMII (serial MII), and a serial synchronous MII is an SSMII (serial sync MII); a 1000 M Ethernet MII is referred to as a CMII (gigabit MII), and a simplified version of the GMII is an RGMII (reduced CMII); a 10 G Ethernet MII interface is referred to as an XGMII and an XAUI; a 40 G Ethernet MII interface is an XLGMII and an XLAUI, and a 100 G Ethernet MII interface is a CGMII and a CAUI.

Interleaving Processing:

An Ethernet is a communications protocol standard that is most commonly used in an existing local area network. A CSMA/CD (carrier sense multiple access with collision detection) technology is used in the Ethernet, and the Ethernet runs on a plurality of types of cables at a rate of 10 M/S.

A GE interface is a Gigabit Ethernet interface. An interface with a label "GE" means a 1000 M Ethernet network interface.

An FE interface is a 100 M Ethernet interface. In other words, a current mainstream 100 M network is also referred to as a fast Ethernet.

Figure 1:
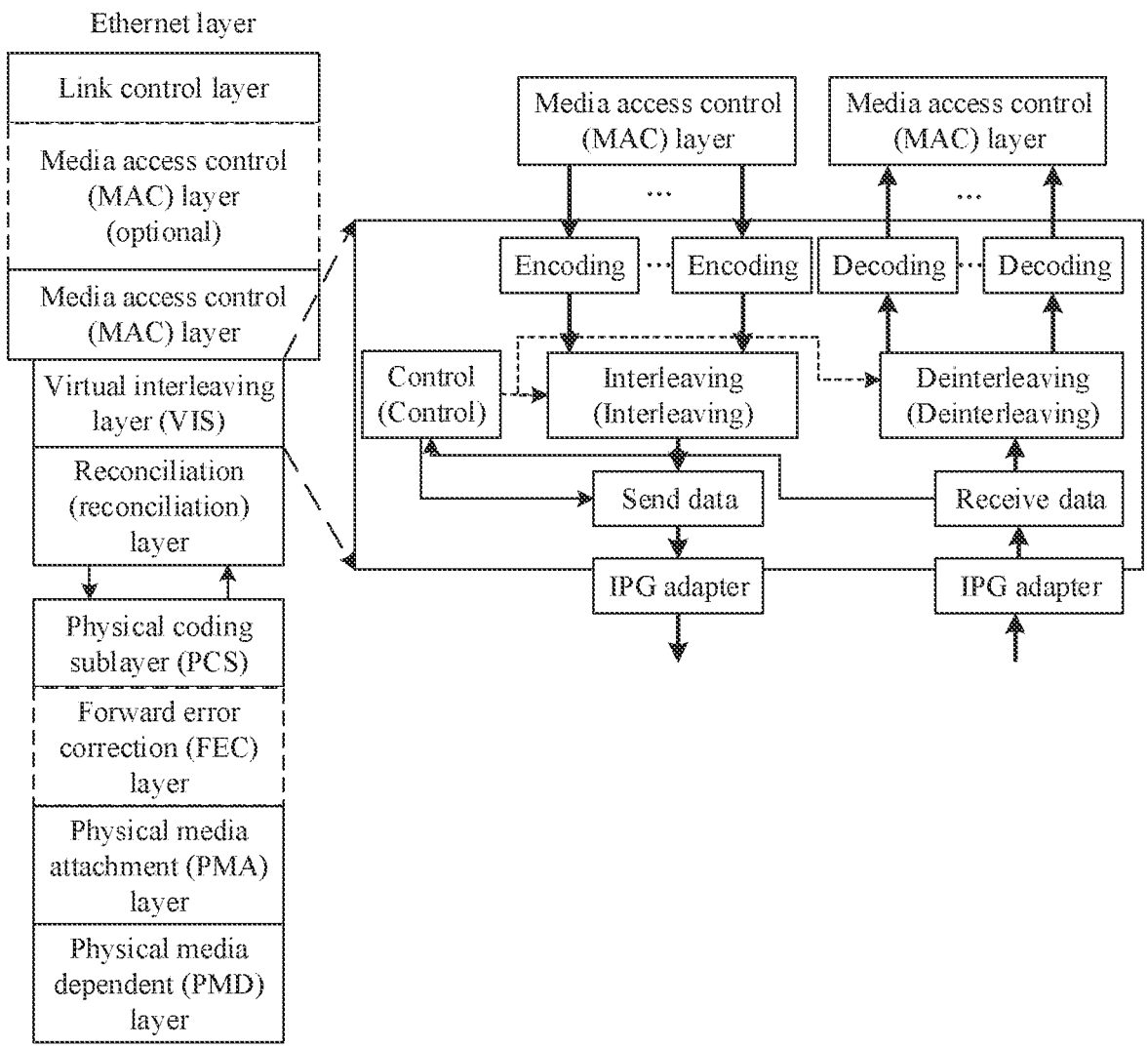
FIG. 1 is a schematic diagram of an internal implementation architecture based on a virtual interleaving sublayer technology.

In a virtual interleaving sublayer (VIS) technology, a VIS layer is located between the MAC layer and a physical coding sublayer (PCS). A main function of the VIS layer is that a plurality of pieces of data at the MAC layer can be encoded and then interleaved, and then sent by using a port. As shown in FIG. 1, the VIS layer is located between the MAC layer and a reconciliation layer. FIG. 1 shows an internal implementation frame of the VIS technology.

Time-division multiplexing (TDM) means that multi-path transmission can also be achieved when different signals are transmitted by using different time periods of a same physical connection. In time-division multiplexing, time is used as a parameter for signal division. Therefore, signals cannot overlap on a time axis. Time-division multiplexing is to divide time provided to an entire channel for information transmission into several time slices (timeslots for short) and allocate these timeslots to each signal source for use.

Programmable logic controller (programmable logic controller, PLC): The programmable logic controller is a type of programmable memory configured to: store a program inside the programmable logic controller, execute user-oriented instructions such as a logic operation, sequential control, timing, counting, and an arithmetic operation, and control various types of mechanical or production processes by using digital or analog input/output.

The programmable logic controller has the following functions and features:

1. The programmable logic controller is easy to use and easy to program. A simple programming language such as a ladder diagram, a logic diagram, or a statement table is used, and no computer knowledge is required. Therefore, a system development cycle is short, and it is easy to perform on-site debugging. In addition, a program can be modified online, and a control scheme is changed without removing hardware.

2. The programmable logic controller has strong functions and a high performance/price ratio. A small PLC has hundreds of programming elements that can be used by users, and has powerful functions, and can implement very complex control functions. The PLC has a high performance/price ratio compared with a relay system with the same functions. The PLC can implement distributed control and centralized management through a communications network.

3. The programmable logic controller has complete hardware, it is convenient for a user to use the programmable logic controller, and adaptability is high. PLC products have been standardized, serialized, and modularized, and are equipped with a variety of hardware apparatuses for users to choose from. The users can flexibly and conveniently perform system configuration to form systems with different functions and different sizes. It is also very convenient to install and wire the PLC. Generally, a wiring terminal is connected to an external wire. The PLC has a relatively strong load capability and can directly drive an ordinary solenoid valve and a small alternating current contactor. After hardware configuration is determined, a user program can be modified to quickly adapt to a change of a process condition.

4. The programmable logic controller has high reliability and a strong anti-interference capability. A series of hardware and software anti-interference measures are adopted for the PLC. Therefore, the PLC has a strong anti-interference capability, and has average fault-free time of more than tens of thousands of hours. The PLC can be directly used on an industrial production site with strong interference. The PLC has been recognized by many users as one of the most reliable industrial control devices.

5. Workload of designing, installing, and debugging a system is small. In the PLC, a software function is used to replace a large quantity of components in a relay control system such as an intermediate relay, a time relay, and a counter, thereby greatly reducing the workload of designing, installing, and wiring a control cabinet.

6. Maintenance workload is small, and it is convenient to maintain the PLC. The PLC has a very low fault rate, and has a perfect self-diagnosis and display function. When a fault occurs on the PLC or an external input apparatus and executor, a cause of the fault can be quickly identified based on information provided by a light-emitting diode or a programmer on the PLC, and the fault can be quickly eliminated by replacing a module.

For example, downlink data transmission is used as an example for description. A VIS layer encodes received data at a MAC layer.

Figure 2:
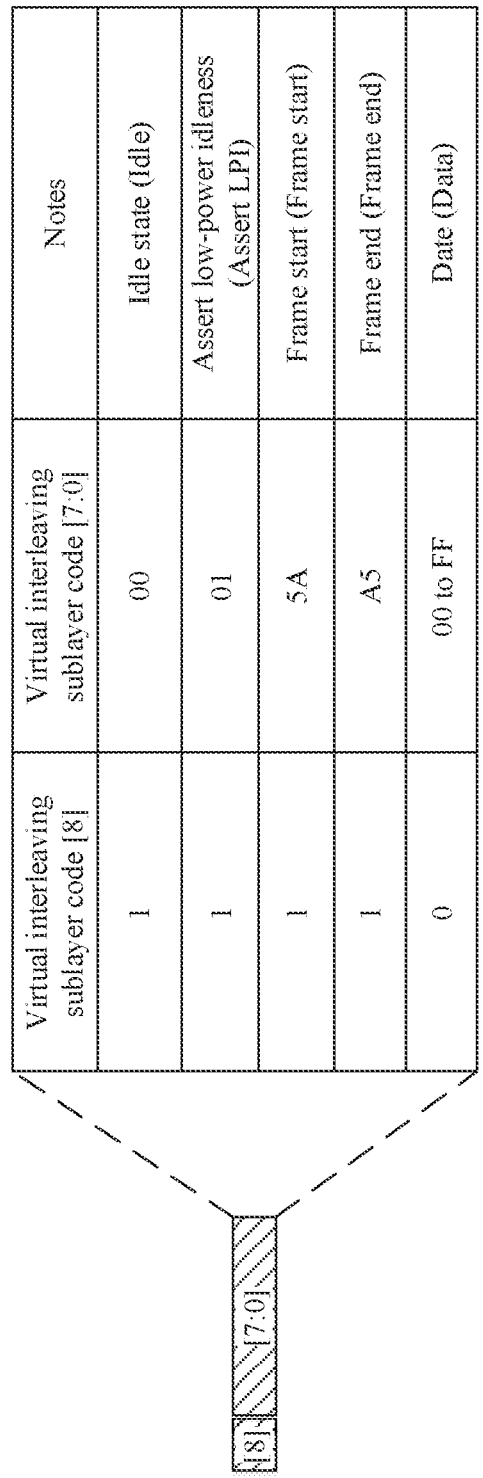
FIG. 2 is a schematic diagram of an encoding manner based on a virtual interleaving sublayer technology.

FIG. 2 shows an encoding manner of the VIS layer, where VIS code [8] represents a highest bit, and VIS code [7:0] represents remaining eight bits. As shown in FIG. 2, in different communication states, there is a specific difference between VIS code [8] and VIS code [7:0]. For example, in an idle state (Idle), VIS code [8] is 1, and VIS code [7:0] is 00.

Figure 3:
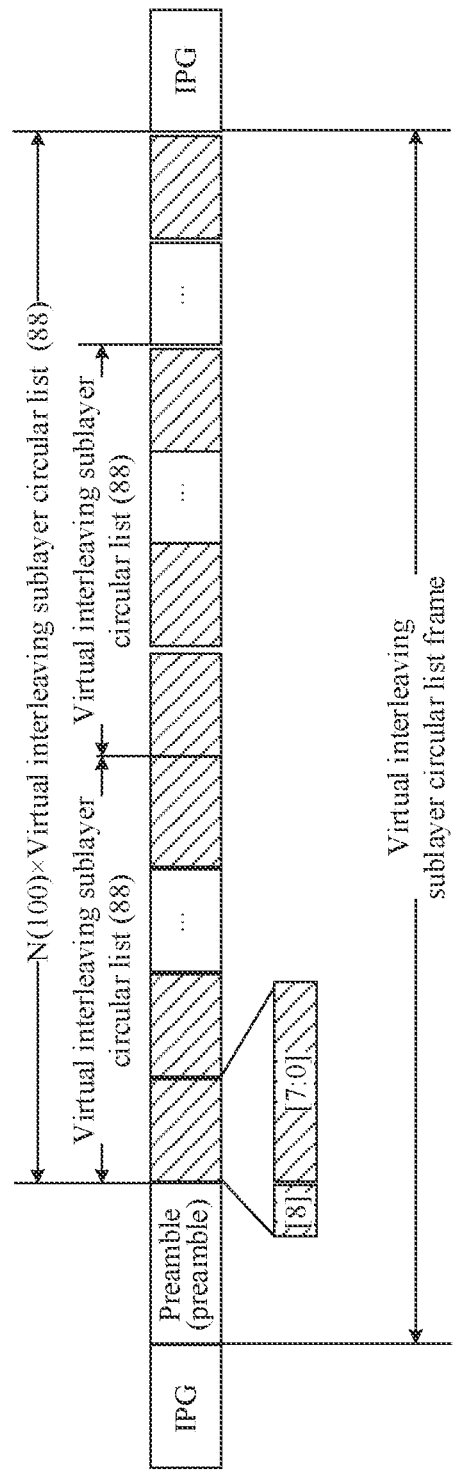
FIG. 3 is a schematic diagram of a frame and an interleaving principle based on a virtual interleaving sublayer technology.

FIG. 3 is a schematic diagram of a VIS frame and an interleaving principle. In terms of the interleaving principle of a VIS, a VIS technology is a time-division multiplexing technology below a MAC layer, and a channel below the MAC layer is time-slotted.

After being time-slotted, the time-slotted channel can be used to transmit a low-speed industrial Ethernet service. However, a common problem caused by time-slotting is one-way delay uncertainty. To be specific, a random relationship between a service arrival moment and a timeslot transmission moment causes service delay uncertainty. One-way delay uncertainty causes asymmetry between an uplink delay and a downlink delay. The asymmetry between the uplink delay and the downlink delay causes an error to time synchronization.

In an industrial Ethernet communications protocol currently widely used in the industry, such as, an Ethernet control automation technology (Ethernet control automation technology, EtherCAT) or Profinet, there is a definite time synchronization requirement, and synchronization precision needs to be within 100 ns. An application scenario of time synchronization is as follows: simultaneous collection of device status information; a periodic action and collaboration; a reaction to an external event; and uniform execution of instructions at a future time. Because an industrial Ethernet has a definite requirement for time synchronization, and in a time-slotting VIS technology, an error is introduced to time synchronization due to asymmetry between an uplink delay and a downlink delay, an asymmetric uplink-downlink delay measurement and compensation technology needs to be used, to resolve the problem that the uplink delay and the downlink delay are asymmetric, and reduce a time synchronization error.

In the prior art, for a common problem of one-way delay uncertainty caused by time-slotting, to be specific, a problem that an error is caused to time synchronization due to asymmetry that is between an uplink delay and a downlink delay and that is caused by time-slotting, a method for asymmetrically calculating an uplink delay and a downlink delay in a flexible Ethernet (Flex Ethernet, FlexE) technology is proposed. A determined part and an undetermined part of a delay in a link are determined, an uplink delay and a downlink of a service in the link are measured by using a boundary of a link with a deterministic delay as a reference point, and an asymmetric delay is calculated based on an uplink delay value and a downlink delay value.

Figure 4:
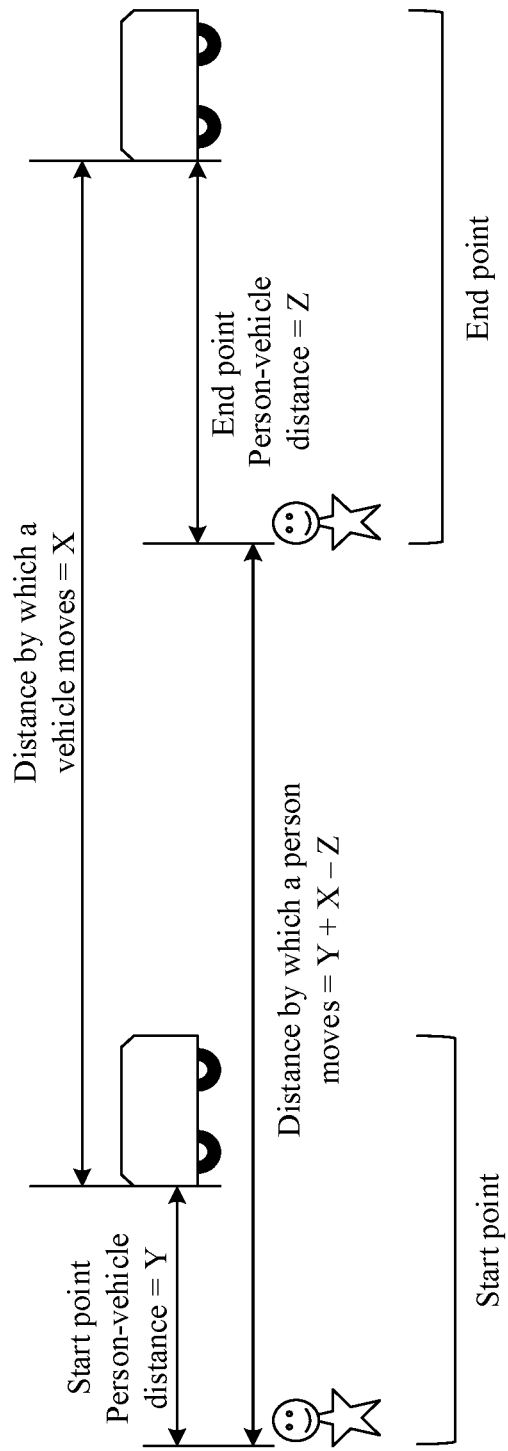
FIG. 4 is a schematic diagram of a delay measurement method in the prior art.

FIG. 4 is a schematic diagram of a delay measurement principle. As shown in FIG. 4, a start point may be equivalent to a FlexE service sending device, and an endpoint may be equivalent to a FlexE service receiving device. A person and a vehicle at the start point may respectively correspond to a service transmit frame header and a reference transmit frame header, and Y may be equivalent to a delay of the service transmit frame header relative to the reference transmit frame header. A person and a vehicle at the endpoint may respectively correspond to a service receive frame header and a reference receive frame header, and Z may be equivalent to a delay of the service receive frame header relative to the reference receive frame header. X may be a transmission delay from the reference transmit frame header to the reference receive frame header. An advance distance of the person is calculated as Y+X−Z based on a distance Y between the person and the vehicle at the start point, a vehicle traveling distance X, and a distance Z between the person and the vehicle at the endpoint, so that a one-way delay Y+X−Z from sending of a service frame header to receiving of the service frame header is obtained.

Based on the foregoing method, an uplink delay and a downlink delay may be separately calculated, and then an uplink-downlink delay deviation is calculated. However, when the foregoing calculation method is used in an application scenario in which a used interface rate is relatively low, to be specific, when there is no available reference frame header at a physical layer, the foregoing delay calculation method is not applicable.

For example, when a currently used GE interface has no reference AM (an alignment marker in a 100 G Ethernet for virtual channel alignment) frame header, application of this solution is limited in a scenario in which a physical interface is a GE.

Figure 5:
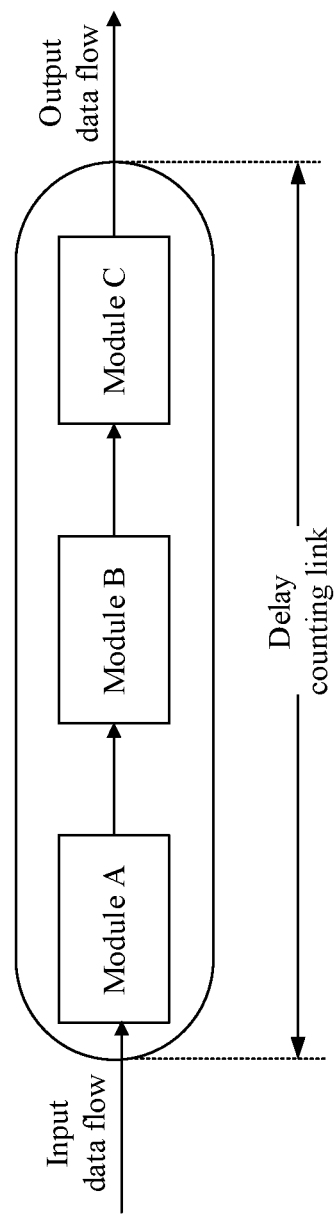
FIG. 5 is a schematic diagram of a delay counting method in the prior art.

In the prior art, there is another delay calculation method, for example, a link delay counting method shown in FIG. 5.

As shown in FIG. 5, a link segment may include three modules: a module A, a module B, and a module C, and a delay of the link segment needs to be counted. In this case, a quantity (denoted as m) of input data flows, and a quantity (denoted as n) of output data flows (denoted as n) of the link segment may also be counted. A delay in a link may be understood as being caused by data buffering processing. To be specific, an amount of data buffered inside the link segment may be: Amount of input data−Amount of output data=m−n. Internal buffering time of a single piece of data may be obtained based on a data rate, to be specific, a value of an amount (m−n) of internally buffered data may be converted to an internal buffering time value, in other words, a delay of the link segment.

For the foregoing method for calculating a delay based on a statistical value of input and output data traffic, calculation precision is greatly affected by the statistical value, and therefore, there is a relatively high requirement for precision of the statistical value.

For example, first, a statistic object needs to be definite, and a quantity of effectively transmitted code blocks needs to be counted; and second, counting time periods need to be strictly equal, to be specific, an input counting time period and an output counting time period need to be strictly equal.

In terms of the foregoing precision requirement for the statistical value, for a system with synchronized frequency, in other words, a system in which an input/output rate remains unchanged, this method is very easy to implement. However, for a system with a heterogeneous rate, for example, a system in which input is a low-speed interface and output is a time-slotted high-speed interface, a statistical result is greatly affected at an end moment of counting.

Figure 6:
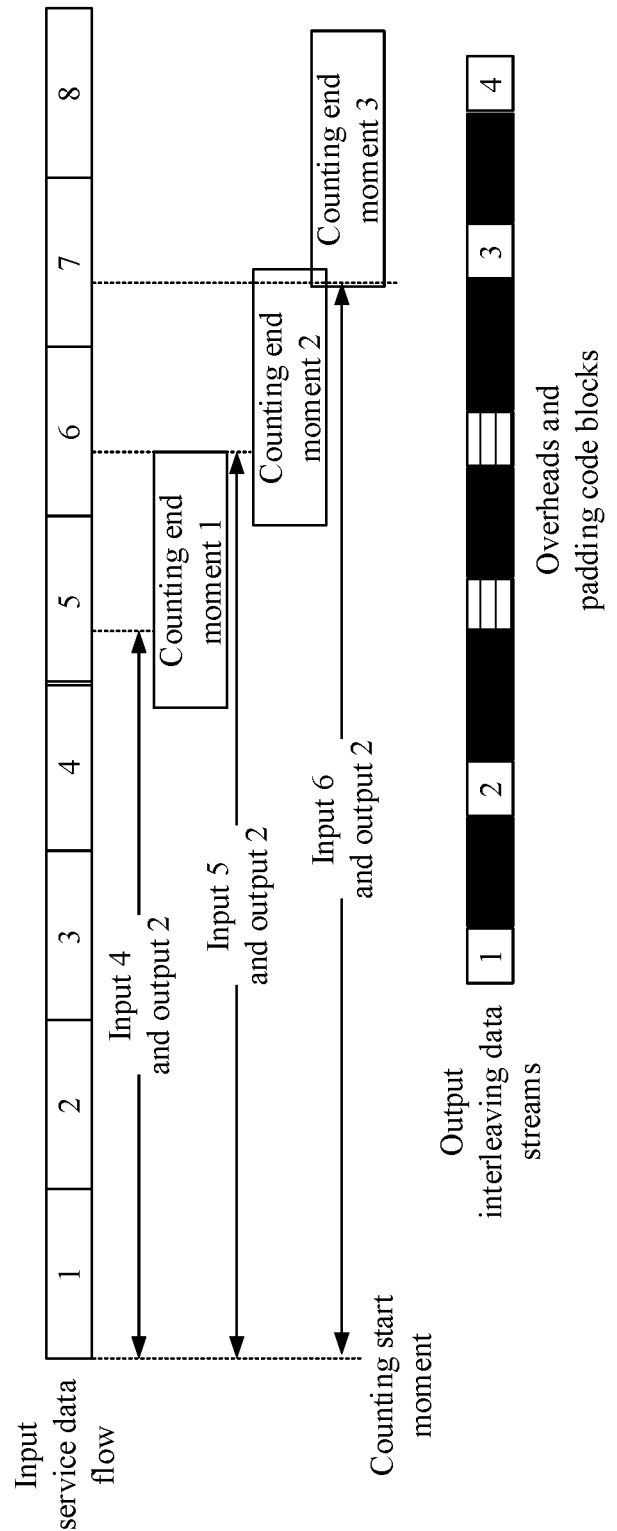
FIG. 6 is a schematic diagram of impact exerted on a statistical result by an end moment of delay counting in the prior art.

FIG. 6 is a schematic diagram of impact exerted on a statistical result by an end moment of counting. There is an interval between timeslots occupied by services. When the end moment of counting moves within the interval, an input statistical value changes, but an output statistical value does not change. In this case, an overall result is greatly affected. Consequently, the statistical value has a large error. For example, as shown in FIG. 6, for three different end moments of counting, an input statistical value changes, but an output statistical value remains unchanged.

For example, when the input statistical value is 4, the output statistical value is 2; when the input statistical value is 5, the output statistical value is 2; and when the input statistical value is 6, the output statistical value is 2. Therefore, when moving within the interval, the input statistical value changes all the time, but the output statistical value remains unchanged. Consequently, a relatively large error is caused to the statistical value.

The foregoing is a method for generating a delay when a data flow is processed inside a computing device in the prior art.

In an industrial network, the VIS technology improves interoperability between different types of PLCs and drives. However, when a data flow service is applied to the VIS technology, the following problems exist:

First, when the service is mapped to a timeslot at a VIS, because a relationship between a service arrival moment and a timeslot moment that carries the service is undetermined, a sending delay of the service is undetermined.

Figure 7:
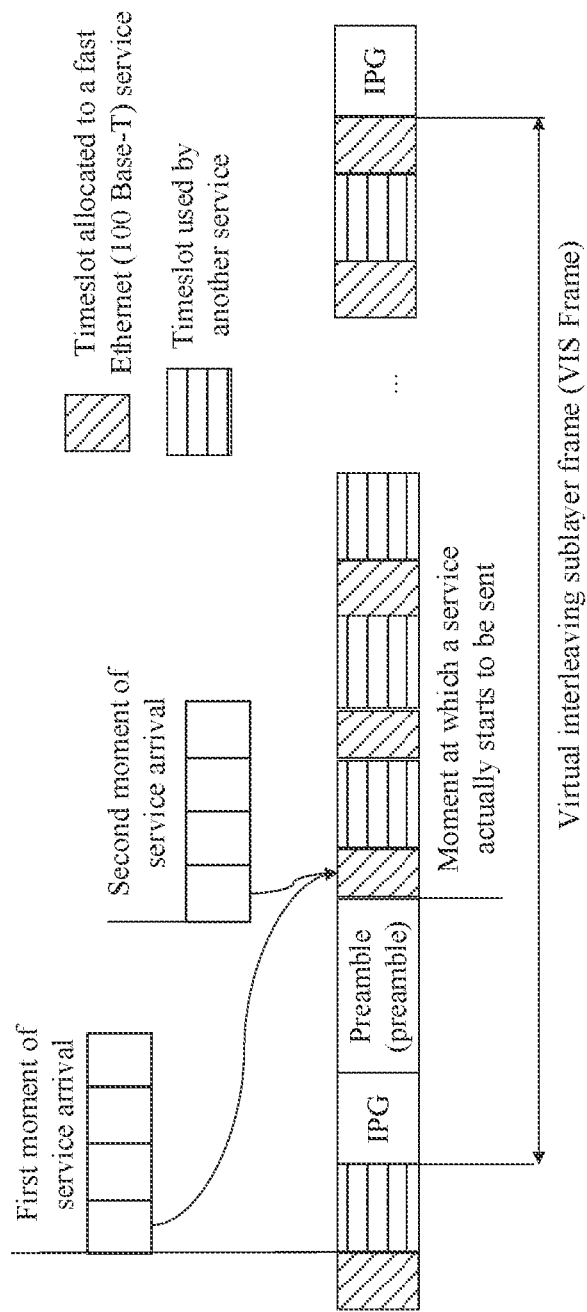
FIG. 7 is a schematic diagram of delay uncertainty introduced by service mapping in a virtual interleaving sublayer technology.

For example, FIG. 7 is a schematic diagram of delay uncertainty introduced by service mapping. In a case 1 and a case 2 in FIG. 7, a delay difference is a maximum timeslot interval.

As shown in FIG. 7, a service needs to be transmitted in an allocated 100 Base-T timeslot. When a service arrival moment is a first moment, because a timeslot allocated to a 100 Base-I service has been missed, the service can only be transmitted until next timeslot allocated to the 100 Base-T service, in other words, the service reaches a second moment. Therefore, a delay value between the first moment of service arrival and a moment at which the service is actually transmitted, in other words, the second moment of service arrival, is generated. The delay value is generated due to the relationship between the service arrival moment and the timeslot moment that carries the service, and consequently, a service sending delay cannot be determined.

Second, after a padding code block is removed from data parsed from a VIS frame, the data is written into an egress cache, and when data in the egress cache reaches a specific waterline, service data with a constant bit rate (CBR) starts to be read from the egress cache and output. Due to existence of the padding code block and a VIS frame header, the service data does not reach the egress cache evenly.

Figure 8:
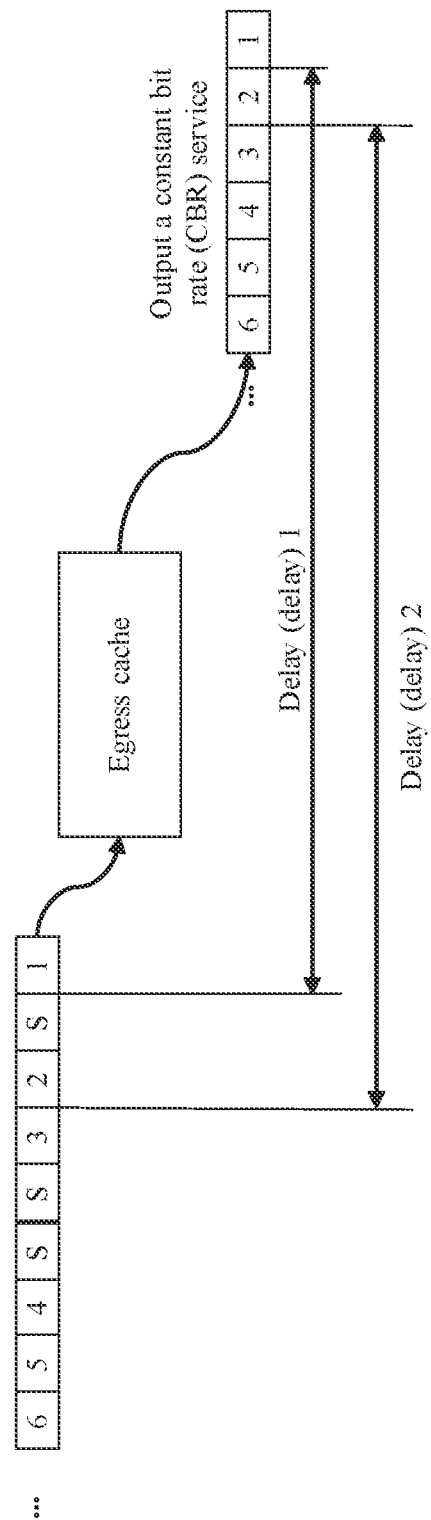
FIG. 8 is a schematic diagram of delay uncertainty introduced by service egress buffering in a virtual interleaving sublayer technology.

For example, FIG. 8 is a schematic diagram of delay uncertainty introduced by service egress buffering. As shown in FIG. 8, a delay from entry of a code block 1 into an egress cache to output of a CBR service is a delay 1, a delay from entry of a code block 2 into the egress cache to output of the CBR service is a delay 2, and a difference between the delay 1 and the delay 2 is not a distance between the code block 1 and the code block 2. Because there is a padding code block S between the code block 1 and the code block 2, a delay of the code block 1 and a delay of the code block 2 are inconsistent, and a difference between the delay of the code block 1 and the delay of the code block 2 is a distance of the padding code block S between the code block 1 and the code block 2. Consequently, due to existence of the padding code block and a VIS frame header, service data does not reach the egress cache evenly.

TABLE 1

| Slot interval | Quantity of cascaded devices | Uplink-downlink delay difference | Introduced time synchronization error |
|---|---|---|---|
| 7 bytes + IPG 12 bytes + preamble 8 bytes = 27 bytes = 216 ns | 1 | 216 ns * 1 = 216 ns | 108 ns |
| | 2 | 216 ns * 2 = 432 ns | 216 ns |
| | n | 216 ns * n | 108 ns * n |

Time-slotting of a GE port is used as an example to calculate the introduced time synchronization error carried in Table 1. First 7 bytes are an inherent gap between timeslots allocated to a service, and the service occupies one of eight timeslots. A VIS inter-packet gap (IPG) is 12 bytes, a VIS preamble is 8 bytes, and there are 27 bytes in total. The bytes are converted into time of 216 ns based on a corresponding rate.

It should be understood that this calculation manner is conservative calculation. In actual application, because channel bandwidth is greater than service bandwidth, a padding code block is randomly added to a service timeslot, thereby further increasing a timeslot interval that carries data. A time synchronization error introduced by asymmetry between an uplink delay and a downlink delay is half of an uplink-downlink delay deviation.

In conclusion, a problem of delay uncertainty is caused when there is service mapping or egress buffering for a service in a VIS timeslot. In addition, as a quantity of cascaded VIS devices increases, nondeterministic delays accumulate. Consequently, consistency of an uplink delay and a downlink delay cannot be ensured, thereby causing asymmetry between the uplink delay and the downlink delay. The asymmetry between the uplink delay and the downlink delay causes a very large error to time synchronization of client signals, and consequently, time synchronization performance of the client signals is not up to the standard.

Based on the foregoing problem, this application proposes a delay calculation method, to calculate and compensate for an uplink-downlink delay deviation generated when a service flow is carried in a VIS timeslot, thereby improving time synchronization performance of signals and avoiding affecting time synchronization of client signals.

It should be noted that, in some of processing procedures of data inside a device, a delay is determined, but in some other processing procedures of the data inside the device, a delay is undetermined. In this way, residence time of a service flow inside the device is generally undetermined. For example, after each power-on or initialization, a delay value is inconsistent with a previous value (after power-on or initialization is completed, the delay value is stable). This embodiment of this application is mainly for a delay value generated when a service flow passes through a link segment with a nondeterministic delay inside a device, for example, as shown in FIG. 7 and FIG. 8.

In this embodiment of this application, for a CBR service, a delay of a single code block may represent a delay of an entire service flow. Therefore, in this embodiment of this application, a measurement code block may be inserted into a service flow. For example, the measurement code block may be a delay measurement code block. An actual uplink delay and an actual downlink delay generated when the measurement code block passes through a link segment with an undetermined delay in a link are counted. For example, the measurement code block is inserted into an ingress service data flow of the link segment with the undetermined delay, the measurement code block is detected in an egress service data flow of the link segment, and a time difference between a moment at which the measurement code block is inserted and a moment at which the measurement code block is detected is calculated, to obtain a delay generated when the measurement code block passes through the link segment, that is, an undetermined delay value of the link segment. The delay value is transmitted in a network through special code of a VIS, and an uplink-downlink delay deviation is calculated on a service egress node or a main control device, and asymmetric compensation is performed.

It should be understood that the measurement code block is inserted into the service flow on an access node, terminated on the service egress node, and transparently transmitted on an intermediate node.

This embodiment of this application is described in detail below with reference to specific examples. It should be noted that the description is merely intended to help a person skilled in the art better understand this embodiment of this application, but are not intended to limit the scope of this embodiment of this application.

It should be noted that terminologies such as "component", "module", and "system" used in this application are used to indicate computer-related entities, hardware, firmware, combinations of hardware and software, software, or software in execution. For example, a component may be, but is not limited to, a process that runs on a processor, a processor, an object, an executable file, a thread of execution, a program, and/or a computer. As shown in the figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network such as the Internet interacting with other systems by using the signal).

It should be understood that manners, cases, categories, and embodiment division in the embodiments of this application are merely for the convenience of description, and should not constitute a special limitation. Various manners, categories, cases, and features in the embodiments may be combined without contradiction.

It should be further understood that, in the embodiments of this application, "first", "second", and the like are merely intended to indicate different objects, and do not mean that referred objects are otherwise limited.

Figure 9:
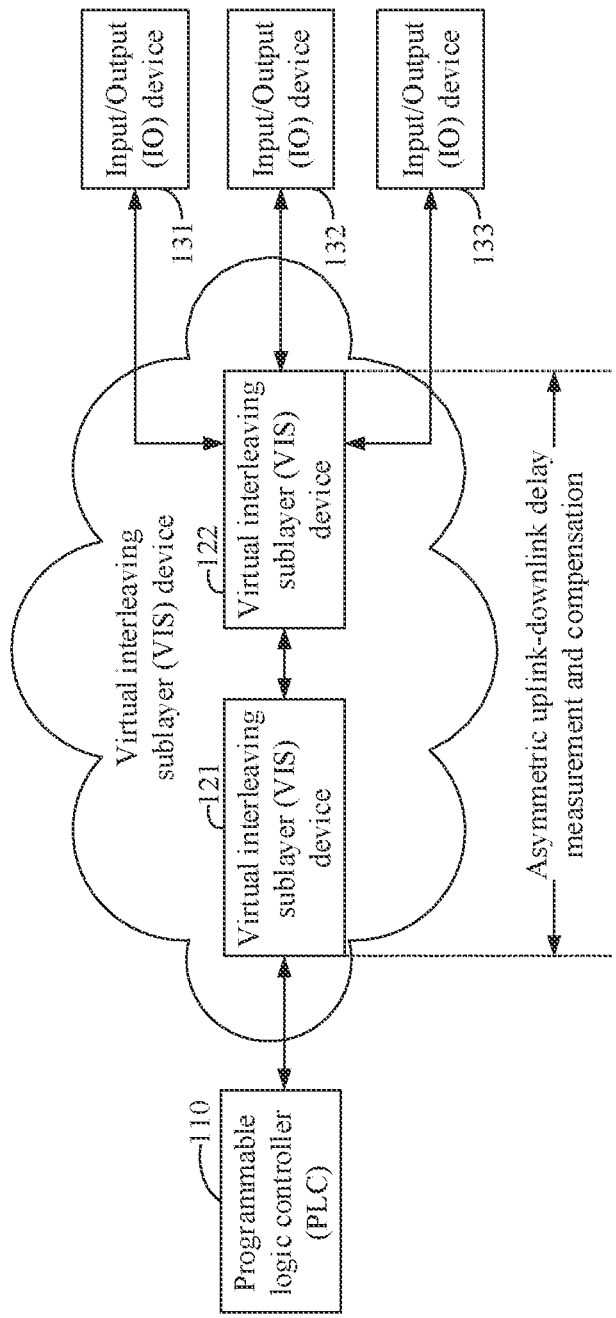
FIG. 9 is a schematic diagram of an application scenario according to an embodiment of this application.

FIG. 9 is a schematic diagram of an application scenario according to an embodiment of this application.

As shown in FIG. 9, this solution may be applied to an industrial Ethernet scenario. The industrial Ethernet scenario includes a programmable logic controller 110, one or more input/output devices such as an input/output device 131, an input/output device 132, and an input/output device 133, and a virtual interleaving sublayer network that may include one or more virtual interleaving sublayer devices such as a virtual interleaving sublayer device 121 and a virtual interleaving sublayer device 122.

As shown in FIG. 9, the VIS device may be further used for interconnection between industrial Ethernet devices PLC and IO, to provide performance assurance with a deterministic low delay.

For example, in this application scenario, the PLC may be considered as a master control unit, or may be considered as a master device for ensuring uplink and downlink time synchronization; and the IO device may be considered as a slave unit, or may be considered as a slave device (slave) for ensuring uplink and downlink time synchronization. The VIS device provides interconnection between the PLC and the IO, to resolve, based on this application, a problem of asymmetry between an uplink delay and a downlink delay introduced by a VIS network, so that the IO device and the PLC can accurately perform time synchronization.

It should be understood that FIG. 9 is an example description of an application scenario according to an embodiment of this application. This is not limited in this embodiment of this application. In addition to the foregoing industrial Ethernet, this embodiment of this application may be further applied to a flexible Ethernet or another network.

Figure 10:
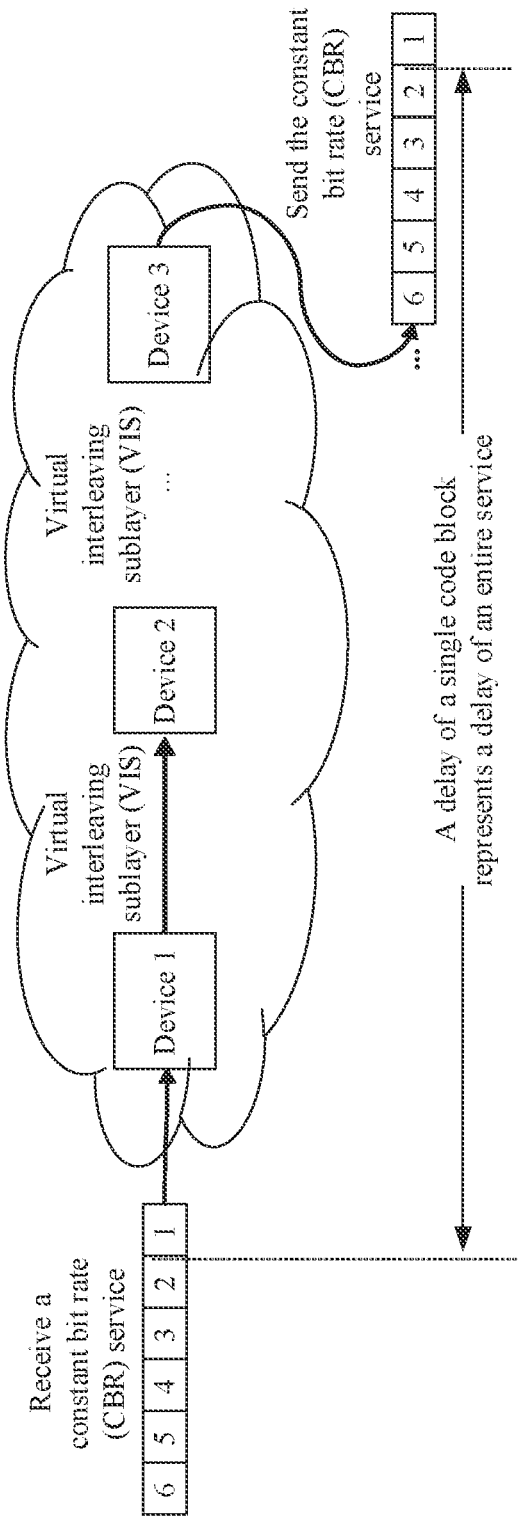
FIG. 10 is a schematic diagram of a delay measurement method according to an embodiment of this application.

FIG. 10 is a schematic diagram of delay calculation according to an embodiment of this application.

In this application, a delay value generated when a service passes through a link segment with a non-deterministic delay inside a device is measured, the delay value is transmitted in a network through special code of a VIS, an uplink-downlink delay deviation is calculated on a service egress node or a main control device, and asymmetric compensation is performed.

It should be noted that, in some of processing procedures of data inside a device, a delay is determined, but in some other processing procedures of the data inside the device, a delay is undetermined. Therefore, residence time of a service flow inside the device is generally undetermined. For example, after each power-on or initialization, a current delay value may be inconsistent with a previous delay value (after power-on or initialization is completed, a delay value may be stable).

For a CBR service, a delay of a single code block can represent a delay of the entire service. Therefore, a delay measurement code block may be inserted into the service, and an actual uplink delay and an actual downlink delay generated when the code block passes through a link segment with an undetermined delay in a link are counted, to obtain an undetermined uplink delay and an undetermined downlink delay of the service, thereby performing asymmetric compensation based on a calculation result.

In this embodiment of this application, three steps may be performed to implement a delay calculation and compensation method in this application: calculation of an undetermined delay value, transmission of the undetermined delay value, and calculation and compensation of an uplink-downlink delay deviation.

Step 1: Calculation of an undetermined delay value.

In this embodiment of this application, for each service, an undetermined delay value of the service on each hop of device is calculated after the service passes the device. The undetermined delay value may include an undetermined uplink delay value and an undetermined downlink delay value.

For example, a link segment with an undetermined delay is selected, and the link segment with the undetermined delay may be considered as an undetermined link segment.

A measurement code block may be inserted into an ingress service data flow of a first link segment, the measurement code block is detected in an egress service data flow of the link segment, and a time difference between a moment at which the measurement code block is inserted and a moment at which the measurement code block is detected is calculated, to obtain a delay generated when the measurement code block passes through the first link segment, that is, an undetermined delay value of the link segment.

It should be understood that the measurement code block is inserted on a service access node, terminated on a service egress node, and transparently transmitted on an intermediate node.

The measurement code block may be 0x1FF, and a VIS encoding manner is shown in Table 2.

TABLE 2

| VIS code [8] | VIS code [7:0] | Notes |
| --- | --- | --- |
| 1 | FF | Measurement code block |

For example, after a service channel is established, a control device initiates an asymmetric delay measurement and compensation command for a service, and a VIS device that receives the command executes a delay measurement code block insertion action, and after inserting a delay measurement code block, sends an indication signal to a delay calculation unit. After the delay measurement code block is inserted, a delay measurement identification module in the VIS device detects the delay measurement code block in a downlink data flow of a link, and after detecting the delay measurement code block, sends an indication signal to the delay calculation unit in the VIS device. The delay calculation unit calculates, based on the insertion indication signal and the detection indication signal an actual delay generated when the delay measurement code block passes through a link segment with an undetermined delay. Independent calculation is performed in an uplink and a downlink, to obtain an uplink value and a downlink value.

Step 2: Transmission of the undetermined delay value.

In this embodiment of this application, when a delay value of an undetermined link segment is calculated, an uplink link segment and a downlink link segment may be differentiated by using different VIS code, and are inserted into a service data flow and share a timeslot channel with service data, and are transmitted together with a service signal.

For example, an undetermined uplink delay value and an undetermined downlink delay value are separately encoded into code groups, and the code groups are inserted into an uplink service flow and a downlink service flow as padding code blocks, and are transmitted to an edge node or a control device. In the code group, two 8B9B code blocks may be used as one group, and a first code block may be a control code block, to indicate that a delay measurement value is transmitted in a subsequent control block, as shown in Table 3.

TABLE 3

| VIS code [8] | VIS code [7:0] | Notes |
| --- | --- | --- |
| 1 | 55 | Uplink delay code block identifier |
| 1 | AA | Downlink delay code block identifier |
| 1 | XX | Delay value |

Step 3: Calculation and compensation of a delay deviation of an uplink link segment and a downlink link segment.

In this embodiment of this application, a manner of calculating and compensating for the delay deviation of the uplink link segment and the downlink link segment includes but is not limited to the following two manners:

Manner 1: A VIS edge device performs calculation and compensation. To be specific, delay values calculated by all uplink and downlink nodes are transmitted to the edge device, and the edge device calculates a delay deviation to determine whether delay compensation needs to be performed on this node.

Manner 2: A client device performs compensation. To be specific, when a VIS network interface card is integrated on the client device, or there is a communications interface between the client device and a VIS device, delay values of all nodes may be transmitted to the client device, and compensation is performed by using a compensation function of the client device, and the VIS device does not need to perform compensation.

It should be understood that, in addition to the foregoing industrial Ethernet, this embodiment of this application may be further applied to a flexible Ethernet or another network. For example, this application is used on a FlexE interface to resolve a problem that an uplink delay and a downlink delay are asymmetric. A 64B/66B encoding manner may be used for a measurement code block in a flexible Ethernet (FlexE). In this encoding, O code (ordered sets) is used to transmit control information. The O code is a specially-encoded code block, and can be uniquely identified in 64B/66B encoding.

For example, when the 64B/66B encoding manner is used, 0x4B+0xB may be used to represent a delay measurement code block, and D1, D2, D3, C4, C5, C6, and C7 in the measurement code block are used to distinguish different functions. For example, when values of all these fields are 0, it indicates that the code block is a simple code block with a delay measurement identifier. An uplink delay value and a downlink delay value are distinguished by using a value of C4, and a delay value is transmitted by using a total of 24 bits of the fields D1/D2/D3.

When the 64B/66B encoding manner is used, because content of a coded block is relatively rich and overheads are large, the delay value does not need to be transmitted in a code group manner.

Figure 11:
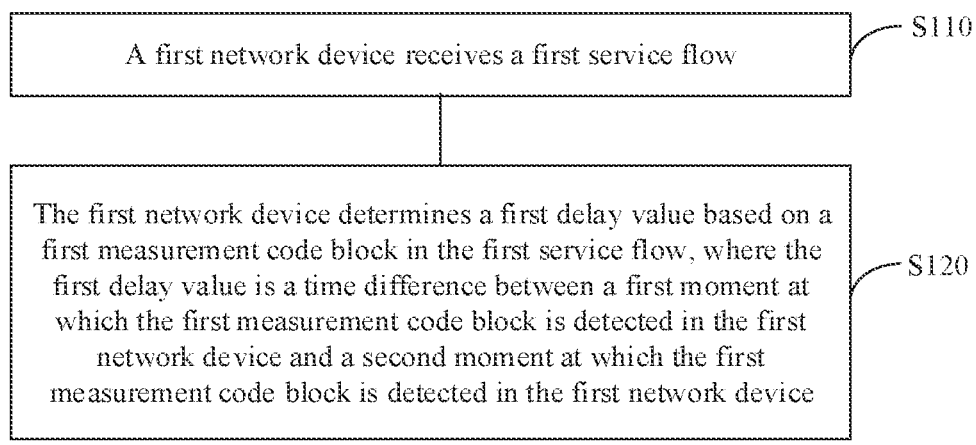
FIG. 11 is a schematic diagram of a delay measurement method according to an embodiment of this application.

FIG. 11 is a schematic diagram of a delay calculation method according to an embodiment of this application. The method in FIG. 11 may be applied to the network architecture in FIG. 9. The method in FIG. 11 may also be applied to a system that includes a network device, a first client device, and a second client device. For example, the method may be applied to an industrial Ethernet. The method in FIG. 11 includes the following steps:

S110: A first network device receives a first service flow.

S120: The first network device determines a first delay value based on a first measurement code block in the first service flow, where the first delay value is a time difference between a first moment at which the first measurement code block is detected in the first network device and a second moment at which the first measurement code block is detected in the first network device.

In this embodiment of this application, a delay value of an entire service may be determined by using a delay value of a single measurement code block. Therefore, a client device or an edge network device resolves, based on the delay value, a problem in a time-slotting technology that an error is introduced into time synchronization because an uplink delay and a downlink delay are asymmetric. An uplink delay value and a downlink delay value are determined, and the uplink delay value and the downlink delay value are used to compensate for time, so that the problem that the uplink delay and the downlink delay are asymmetric is alleviated, thereby reducing a time synchronization error.

It should be noted that, in this embodiment of this application, different delay values need to be measured for different service flows. After a network device is powered on or initialized, a delay value may change. After power-on or initialization is completed, the delay value may be considered as stable.

It should be understood that, in this embodiment of this application, the first delay value is a difference between two times at which the measurement code block is detected, and the first delay value is a delay value of the first service flow in the first network device. Client devices may be connected by using a plurality of network devices, and in this case, a delay value may be measured for each network device.

Optionally, the first network device may further receive a second service flow, where a transmission direction of the second service flow is opposite to a transmission direction of the first service flow; and the second service flow and the first service flow belong to a same service; and the first network device determines a second delay value based on a second measurement code block in the second service flow.

It should be noted that the first network device may receive a first service flow sent by the first client device, or may receive a second service flow sent by the second client device, in other words, the first network device may measure an uplink delay value and a downlink delay value.

Optionally, the method further includes: sending, by the first network device, at least one of the first delay value and the second delay value to the transmission direction of the first service flow or the transmission direction of the second service flow.

For example, the first network device may send the first delay value and the second delay value to the first client device or the second client device.

For example, the first network device may send the first delay value and the second delay value to an edge network device, and the edge network device is a network device connected to the first client device or the second client device.

It should be understood that for a method for determining the second delay value based on the second measurement code block, refer to a method for determining the first delay value based on the first measurement code block. The two methods have similar specific processes.

Optionally, when the first network device is a first network device in the transmission direction of the first service flow, the first network device receives the first service flow, the first network device sets the first measurement code block in the first service flow, and the first network device determines the first delay value based on the first measurement code block.

To be specific, when the first network device is the first network device that is in the transmission direction of the first service flow, and that is configured to connect to a client device, after receiving the first service flow, the first network device sets the first measurement code block in the first service flow, and the first network device determines the first delay value based on the first measurement code block.

It should be understood that setting the first measurement code block in the first service flow may be inserting the first measurement code block into the first service flow or adding the first measurement code block to the first service flow.

It should be noted that, in this embodiment of this application, the first measurement code block and the second measurement code block may be multiplex an idle-state code block. For example, a preset value is set in an idle-state measurement code block to generate a measurement code block. This is the encoding manner shown in Table 2. Alternatively, when the measurement code block is applied to a FlexE, a 64B/66B encoding manner may be used.

It should be noted that the first measurement code block and the second measurement code block are coded blocks with identification information, the first measurement code block is carried in the first service flow, and the second measurement code block is carried in the second service flow. The measurement code block may be a control code block. An encoding manner of the measurement code block is consistent with an encoding manner of a service, and is identified by using unique identifiable code.

Optionally, when the first network device is the first network device in the transmission direction of the first service flow, the first network device sets the first measurement code block in the first service flow when the first network device receives a first instruction, where the first instruction is used to instruct to measure a delay value of the first service flow.

For example, when the first service flow is transmitted from the first client device to the second client device by using at least one network device, a downlink is formed, and when the first service flow is transmitted from the second client device to the first client device by using at least one network device, an uplink is formed. In the downlink, when a first access network device can receive a first instruction sent by the first client device, the first access network device sets the first measurement code block in the first service flow. In the uplink, when a first access device can receive first instruction information sent by the second client device, the first access device sets the first measurement code block in the first service flow.

For example, when the first network device is the first network device in the transmission direction of the first service flow, in other words, the first network device is a network device connected to the first client device in the downlink, and is an access network device connected to the second client device in the uplink, the first network device records the first moment when writing the first service flow including the first measurement code block into a cache, and when a sending timeslot of the first service flow arrives, the first network device records the second moment when the first network device detects the first measurement code block when reading the first service flow from the cache, and determines the first delay value based on the first moment and the second moment.

Figure 12:
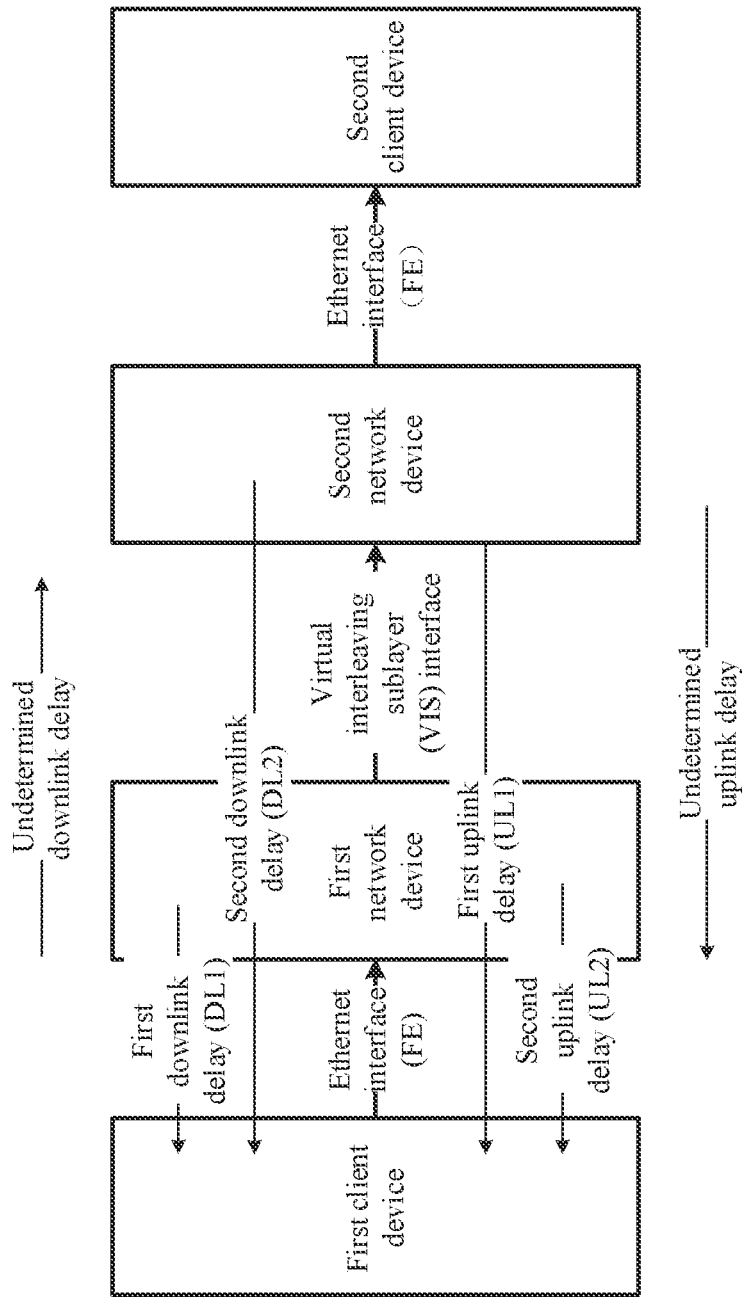
FIG. 12 is a schematic diagram of a delay measurement method according to an embodiment of this application.

For example, in FIG. 12, the first network device in the downlink may be a virtual interleaving sublayer device 1 (a VIS device 1), or the first network device in the uplink may be a virtual interleaving sublayer device 2 (a VIS device 2). For the downlink, after a service channel is established the first client device (for example, a control device) sends an asymmetric delay measurement and compensation command for the first service flow to the VIS device 1. The VIS device 1 receives the measurement and compensation command, executes a delay measurement code block insertion action, inserts 0x1FF into a service flow of an FE, writes the inserted measurement code block 0x1FF into a cache at the same time, and records the first moment; when a sending timeslot of the first service flow arrives, the VIS device 1 reads the first service flow from the cache, and records the second moment after detecting the measurement code block 0x1FF; and the VIS device 1 may determine a downlink delay value of the first service flow in the VIS device 1 based on the first moment and the second moment, and calculate an undetermined downlink delay DL1 of the first service flow in the VIS device 1.

Optionally, the first network device records the first moment when the first network device detects the first measurement code block in the first service flow before writing the first service flow into a cache;

records the second moment when the first network device detects the first measurement code block when reading the first service flow from the cache; and the first network device determines the first delay value based on the first moment and the second moment.

It should be understood that, that the first network device records the first moment when the first network device detects the first measurement code block in the first service flow before writing the first service flow into a cache may include a plurality of possible implementations. For example, in a process in which the first network device reads the first service flow from the cache, the first network device detects the first measurement code block and directly records the second moment. Alternatively, the first network device may detect the first measurement code block in a process of reading the first service flow from the cache, and records the second moment after reading the first service flow and before sending the first service flow. In this case, the second moment further includes some deterministic delays, that is, a delay between reading of the first service flow and sending of the first service flow. The delay value measurement method in this application may be used to measure a non-deterministic delay value, for example, a delay value between writing of the service flow into the cache and reading of the service flow from the cache when a sending timeslot of the service flow arrives.

For example, when the first network device is not the first network device in the transmission direction of the first service flow, in other words, for the downlink, the first network device is not a network device connected to the first client device, and for the uplink, the first network device is not a network device connected to the second client device, a network device, in this case, may be referred to as an intermediate network device, and the intermediate network device receives the first service flow including the first measurement code block; and the first network device determines the first delay value based on the first measurement code block.

For example, for the downlink, when the first network device is not the first network device in the transmission direction of the first service flow, the first network device may be a network device connected to the intermediate network device, or the first network device may be a network device connected to the second client device.

For example, for the uplink, when the first network device is not the first network device in the transmission direction of the first service flow, the first network device may be a network device connected to the intermediate network device, or the first network device may be a network device connected to the first client device.

For example, when the first network device is not the first network device in the transmission direction of the first service flow, the first network device records the first moment when detecting the first measurement code block; the first network device records the second moment when detecting the first measurement code block in an egress service data flow, and the first network device determines the first delay value based on the first moment and the second moment.

For example, in FIG. 12, the first network device in the downlink may be a virtual interleaving sublayer device 1 (a VIS device 1), or the first network device in the uplink may be a virtual interleaving sublayer device 2 (a VIS device 2). For the downlink, the virtual interleaving sublayer device 1 inserts the measurement code block into the first service flow, and the virtual interleaving sublayer device 2 receives the first service flow into which the measurement code block is inserted. The VIS device 2 detects a measurement code block 0x1FF in a received data flow, and records a first moment. After parsing a service, the VIS device 2 saves the measurement code block 0x1FF into a service egress cache, reads the measurement code block 0x1FF from the cache, and records a second moment. The VIS device 2 calculates an undetermined downlink delay DL2 of the first service flow in the VIS device 2 based on a third moment and a fourth moment.

Optionally, the method further includes: when the first network device records the second moment, deleting, by the first network device, the measurement code block.

For example, for the downlink, a network device connected to the input/output device may delete the measurement code block after recording the second moment.

For example, for the uplink, a network device connected to the control device may delete the measurement code block after recording the second moment.

Optionally, the first measurement code block and the second measurement code block are coded blocks with identification information, the first measurement code block is carried in the first service flow, and the second measurement code block is carried in the second service flow.

It should be understood that the first measurement code block and the second measurement code block may be control code blocks, and an encoding manner of the first measurement code block and the second measurement code block is consistent with an encoding manner of a service, and is identified by using unique identifiable code. The coded block may be divided into two parts: code that is a type of data encapsulation, such as an 8b/10b encoding manner; and coded data that may be referred to as a coded block or may be referred to as a code block.

It should be understood that, in the foregoing possible implementations, the measurement code block may be a code block generated after a preset value is set in an idle-state code block.

Optionally, the method further includes: generating, by the first network device, a first code group based on the first delay value and the second delay value, where the first code group includes information about an uplink-downlink identifier, information about the first delay value, and information about the second delay value, and the uplink-downlink identifier is used to indicate that the first delay value and the second delay value are respectively an uplink delay value and a downlink delay value.

Optionally, the first code group includes one or more coded blocks.

It should be understood that the first code group may be one or more coded blocks. When the first code group is one coded block, the coded block includes the information about the uplink-downlink identifier, the information about the first delay value, and the information about the second delay value. When the first code group is a plurality of coded blocks, the information about the uplink-downlink identifier, the information about the first delay value, and the information about the second delay value may be separately carried in different coded blocks in the first code group.

For example, the first network device generates the first code group based on the first delay value and the second delay value, where the first code group includes a coded block with a first identifier, a coded block carrying the first delay value, a coded block with a second identifier, and a coded block carrying the second delay value, the coded block with the first identifier is used to indicate that the first delay value is an uplink delay value or a downlink delay value, and the coded block with the second identifier is used to indicate that the second delay value is an uplink delay value or a downlink delay value.

It should be noted that a code block with the first identifier and a code block with the second identifier may be control code blocks, and are used to indicate whether a delay value carried by a subsequent code block is an uplink delay value or a downlink delay value.

Optionally, the method further includes: sending, by the first network device, the first code group to a client device, where the first code group includes an uplink delay value and a downlink delay value.

It should be noted that, in this embodiment of this application, the first network device determines a delay value, and transmits the delay value by using a code group, so that the delay value can be transmitted to the client device or the edge network device; and the client device or the edge network device compensates for time.

For example, for an industrial Ethernet, the client device may be a control device or an input/output device.

For example, the first network device sends the first code group to the first client device or the second client device. The first code group may include an uplink delay value and a downlink delay value of the first service flow in the first network device. The client device receives delay code groups sent by all network devices connected to the client device, and compensates for delays of the uplink and the downlink, thereby reducing a time synchronization error.

For example, descriptions are provided by using an example in which the first client device and the second client device are connected by using two network devices, and the first client device for example, the control device) compensates for time.

A device 1 transmits a locally calculated DL1 and UL2 and UL1 and DL2 of a device 2 that are parsed from an uplink data flow to the control device, and the control device obtains four delay values: DL1, DL2, UL1, and UL2. The control device performs calculation as follows: Downlink delay=DL1+DL2; Uplink delay=UL1+UL2. When sending a time deviation adjustment command to the input/output (IO) device, the control device (a PLC) takes an uplink-downlink delay deviation into consideration.

Optionally, the method further includes: sending, by the first network device, the first code group to an edge network device, where the first code group includes an uplink delay value and a downlink delay value, and the edge network device is a network device connected to the client device.

For example, it is assumed that the first client device and the second client device are connected by using a device 1, a device 2, and a device 3. For a downlink, the device 1 transmits DL1 (representing a downlink delay value of the device 1) to the device 3, and the device 2 transmits DL2 to the device 3. The device 3 receives the DL1 and the DL2 and may determine a downlink delay DL1+DL2+DL3 based on DL3 determined by the device 3. In addition, the device 1 may also obtain the DL2 and the DL3. For an uplink, the device 3 transmits UL3 (representing an uplink delay value of the device 3) to the device 1, and the device 2 transmits UL2 to the device 1. The device 1 receives the UL3 and the UL2 and may determine an uplink delay UL1+UL2+UL3 based on UL1 determined by the device 1. In addition, the device 3 may also obtain the UL2 and the UL1.

For example, descriptions are provided by using an example in which the first client device and the second client device are connected by using three network devices, and the edge network device compensates for time. The device 1 and the device 3 perform calculation and compensation as follows:

If DL1+DL2+DL3>UL1+UL2+UL3, an uplink delay, to be specific, a read/write address of an asymmetric delay compensation cache of a control device 1, needs to be increased, so that the uplink delay is increased by DL1+DL2+DL3−UL1−UL2−UL3. The device 3 does not need to compensate for a delay.

If DL1+DL2+DL3<UL1+UL2+UL3, a downlink delay, to be specific, a read/write address of an asymmetric delay compensation cache of a control device 3, needs to be increased, so that the uplink delay is increased by UL1+UL2+UL3−DL1−DL2−DL3. The device 1 does not need to compensate for a delay.

If DL1+DL2+DL3=UL1+UL2+UL3, an uplink delay, and a downlink delay are equal and symmetric, and neither the device 1 nor the device 2 needs to perform compensation.

In the technical solution of this embodiment of this application, a delay value of an entire service can be determined by using a delay value of a measurement code block. A problem in a time-slotting technology that an error is introduced into time synchronization because an uplink delay and a downlink delay are asymmetric is resolved. An uplink delay value and a downlink delay value are determined, and the uplink delay value and the downlink delay value are used to compensate for time, so that the problem that the uplink delay and the downlink delay are asymmetric is alleviated, thereby reducing a time synchronization error.

For example, the first network device in FIG. 12 transmits the calculated DL1 and UL2 and the UL1 and DL2 that are parsed from the uplink data flow to a first client, and the first client obtains four delay values: the DL1, the DL2, the UL1, and the UL2.

The first client learns through calculation that the downlink delay is DL1+DL2, and the uplink delay is UL1+UL2.

When sending a time deviation adjustment command to the second client (the IO device), the first client (the control device) takes the uplink-downlink delay deviation into consideration.

For example, the first network device sends the first code group to an edge network device, where the first code group includes an uplink delay value and a downlink delay value, and the edge network device is a network device connected to the client device.

For example, through calculation and transmission, both the first network device and the second network device can obtain delay values DL1, DL2, UL1, and UL2 of all network devices. An asymmetric delay compensation cache is deployed on both a service egress of the first network device and a service egress of the second network device.

The first network device and the second network device perform calculation and compensation as follows:

If DL1+DL2>UL1+UL2, an uplink delay, to be specific, a read/write address of an asymmetric delay compensation cache of the first network device, needs to be increased, so that the uplink delay is increased by DL1+DL2−UL1−UL2. The second network device does not need to compensate for the delay.

If DL1+DL2<UL1+UL2, a downlink delay, to be specific, a read/write address of an asymmetric delay compensation cache of the second network device, needs to be increased, so that the uplink delay is increased by DL1+DL2−UL1−UL2. The first network device does not need to compensate for the delay.

If DL1+DL2=UL1+UL2, an uplink delay, and a downlink delay are equal and symmetric, and neither the first network device nor the second network device needs to perform compensation.

It should be understood that, in the foregoing descriptions, the VIS device is used as an example for description. The network device in this embodiment of this application is not limited to the VIS device, and may also be applied to a flexible Ethernet or another network.

A specific implementation of this embodiment of this application is described in more detail below with reference to specific examples. It should be noted that the example in the following descriptions is merely intended to help a person skilled in the art understand this embodiment of this application, rather than confining this embodiment of this application to a specific numerical value or a specific scenario shown in the example. A person skilled in the art can apparently make various equivalent modifications or changes based on the examples described above, and such modifications and changes also fall within the scope of the embodiments of this application.

For example, FIG. 12 is a schematic diagram of delay measurement according to an embodiment of this application. A first client device and a second client may be connected by using two network devices. Herein, descriptions are provided by using an example in which the first client device is a control device, the second client device is an input/output device, and the network device is a VIS device. It should be understood that, in this embodiment of this application, the control device may be alternatively connected to the input/output device by using a plurality of network devices, and two network devices are used as an example for description herein.

It should be noted that, as shown in FIG. 12, there is an FE interface between the control device (a PLC) and the VIS device and between the IO device and the VIS device. In this networking manner, the VIS device calculates an undetermined uplink delay and an undetermined downlink delay of each device, and may transmit the delay values to the control device (the PLC). Finally, the PLC performs compensation by using an asymmetric delay compensation function of the PLC.

This method is available when a VIS network interface card is integrated on the PLC, or there is a communications channel between the PLC and the VIS device. Implementation steps are as follows. The following steps are described in a downlink direction.

It should be noted that, in this embodiment of this application, when the first network device is the first network device in the transmission direction of the first service flow, the first network device may be considered as a VIS device 1. When the first network device is not the first network device in the transmission direction of the first service flow, the first network device may be considered as a VIS device 2.

Step 1: After a service channel is established, the control device sends a first instruction for a service flow to a network device 1.

For example, after the service channel is established, the control device sends an asymmetric delay measurement and compensation command for the first service flow to the V1S device 1.

Step 2: When receiving the first instruction sent by the control device, the first network device sets a measurement code block in the first service flow.

For example, the VIS device 1 receives the command, executes a delay measurement code block insertion action, and inserts a measurement code block 0x1FF into a service flow of an FE.

Step 3: When writing the first service flow including the measurement code block into a cache, the first network device records a first moment; when a sending timeslot of the first service flow arrives, the first network device reads the first service flow from the cache; and the first network device records a second moment when the first switch device detects the measurement code block.

For example, the VIS device 1 inserts the delay measurement code block 0x1FF into the first service flow and then writes the first service flow into the cache, and records the first moment, and records the second moment when detecting the delay measurement code block in a downlink data flow.

Step 4: The first network device determines a downlink delay DL1 of the first service flow in the first network device based on the first moment and the second moment.

It should be understood that, in the foregoing four steps, the first network device may be considered as the VIS device 1, in other words, the first network device is the first network device in the transmission direction of the first service flow. In other words, for a downlink, the first network device in the transmission direction of the first service flow is a network device connected to the control device.

Step 5: When the first network device is not the first network device in the transmission direction of the first service flow, for example, is the VIS device 2, the first network device receives the first service flow including the measurement code block, and records a third moment when the first network device detects the measurement code block.

For example, the VIS device 2 detects the measurement code block 0x1FF in the received first service flow, and records the third moment.

Step 6: When the first network device is not the first network device in the transmission direction of the first service flow, the first network device records a fourth moment when detecting the measurement code block in an egress service data flow.

For example, after parsing the first service flow, the VIS device 2 saves the first service flow into a service egress cache, and records the fourth moment when reading the measurement code block 0x1FF from the cache.

Optionally, step 6 further includes: deleting, by the first network device, the measurement code block when recording the fourth moment.

Step 7: Determine an undetermined downlink delay DL2 of the first service flow in the VIS device 2 based on the third moment and the fourth moment.

It should be understood that, in step 5 to step 7, the first network device may be considered as the VIS device 2, in other words, the first network device is a network device other than the first network device in the transmission direction of the first service flow. In other words, for a downlink, the first network device in the transmission direction of the first service flow is an intermediate network device.

Step 8: For an uplink, repeat step 2 to step 7 to obtain an undetermined uplink delay UL1 and an undetermined uplink delay UL2 of the first service flow.

Step 9: Separately encode the undetermined uplink delay value and the undetermined downlink delay value into code groups, insert the code groups into an uplink service flow as padding code blocks, and transmit the uplink service flow to the control device.

Figure 13:
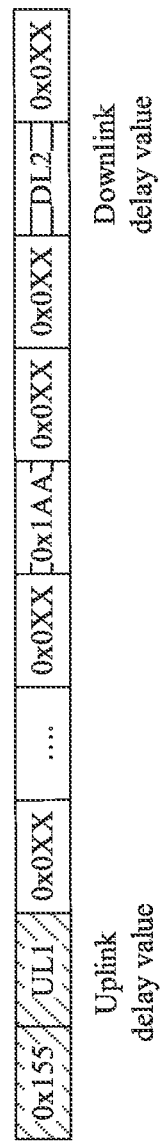
FIG. 13 is a schematic diagram of transmission of a delay value code group according to an embodiment of this application.

For example, as shown in FIG. 13, in a code group, two 8B9B code blocks may be used as one group, and a first code block is a control code block, in other words, 0x155 may represent the control code block. A delay measurement value is transmitted in a subsequent control block. In other words, UL1 and DL2 may represent delay values. 0x0xx may represent a data code block.

Step 10: The control device performs compensation based on an uplink delay value and a downlink delay value.

For example, the VIS device 1 transmits, to the control device, a locally calculated DL1 and UL2 and UL1 and DL2 that are parsed from an uplink data flow, and the control device performs time compensation calculation based on the four obtained delay values DL1, DL2, UL1, and UL2: Downlink delay=DL1+DL2; Uplink delay=UL1+UL2. When sending a time deviation adjustment command to the IO device, the control device takes an uplink-downlink delay deviation into consideration.

It should be understood that, sequence numbers of the foregoing processes do not mean execution sequences. The execution sequences of the processes should be determined based on functions and internal logic of the processes, and should not be construed as any limitation on the implementation processes of the embodiments of this application. In the foregoing descriptions, the VIS device is used as an example for description. The network device in this embodiment of this application is not limited to the VIS device.

Figure 14:
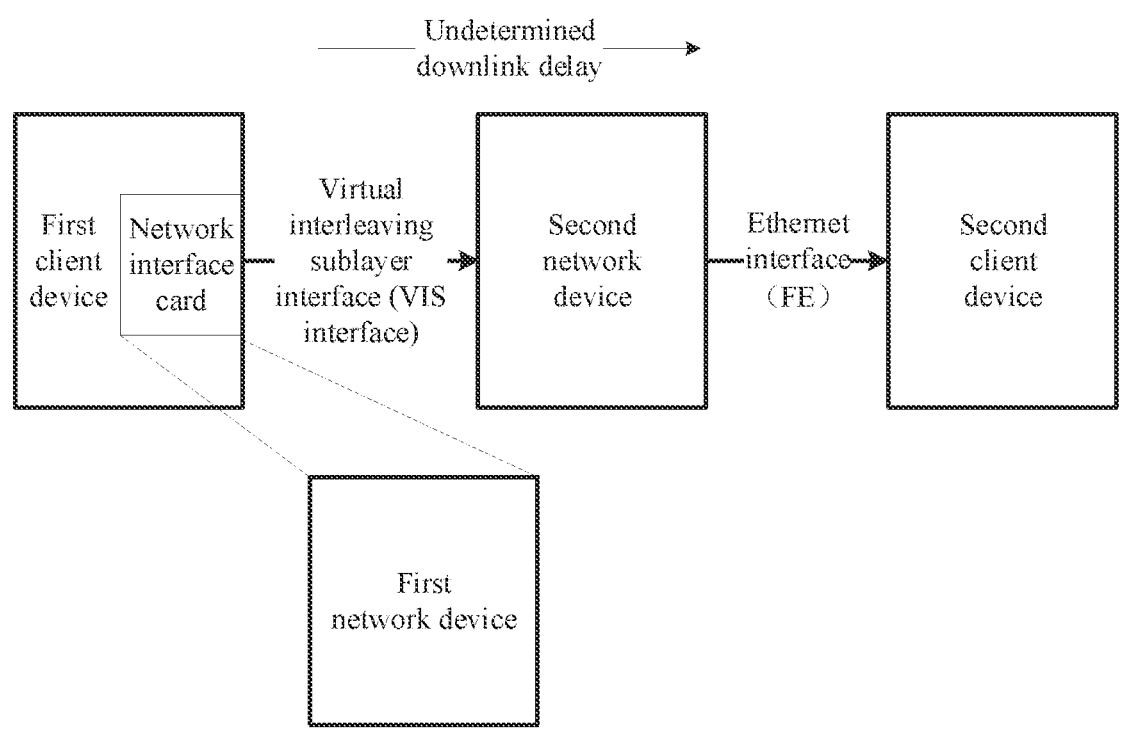
FIG. 14 is a schematic diagram of a delay measurement method according to an embodiment of this application.

It should be noted that the foregoing networking manner may be alternatively shown in FIG. 14. In FIG. 14, the VIS device 1 is integrated into the control device in a form of a network interface card. The first client device needs to support a VIS interface, and the VIS device 1 and the VIS device 2 are similar to those in FIG. 12. Details are not described herein again.

Figure 15:
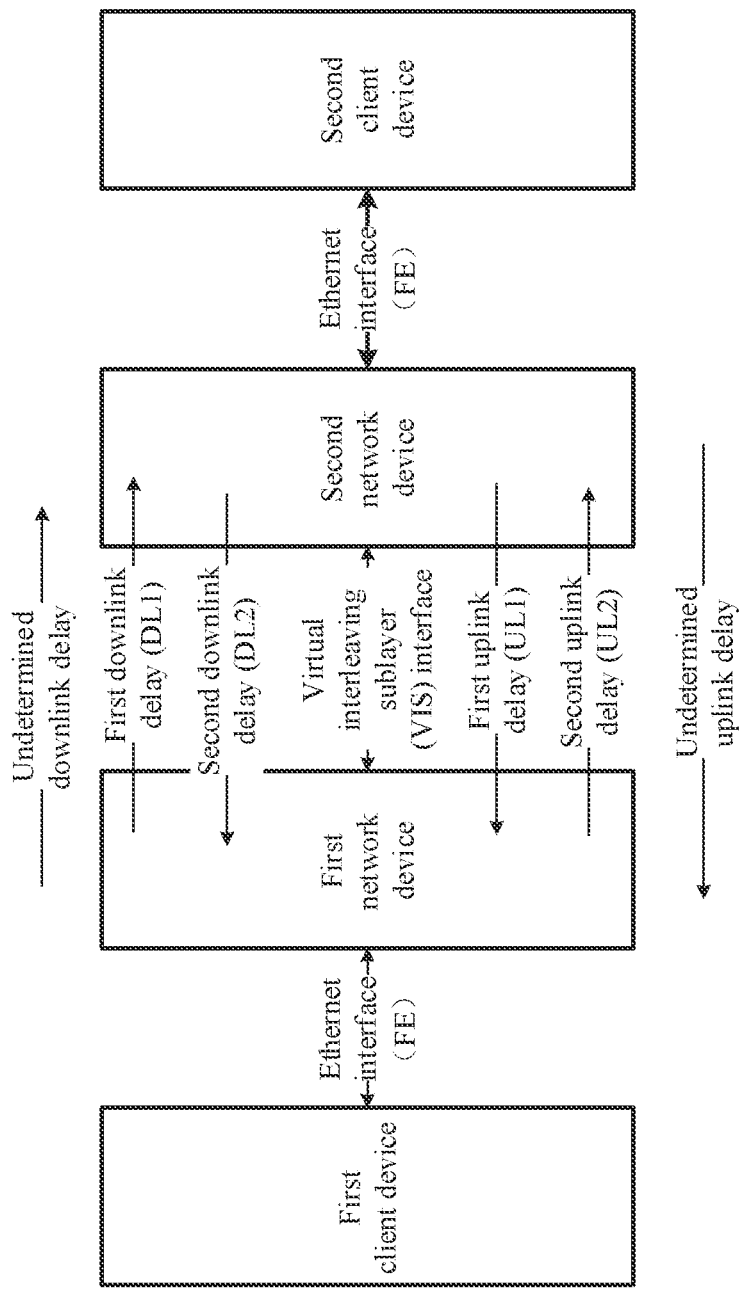
FIG. 15 is a schematic diagram of a delay measurement method according to an embodiment of this application.

For example, FIG. 15 is a schematic diagram of delay measurement according to an embodiment of this application. A first client device and a second client may be connected by using two network devices. Herein, descriptions are provided by using an example in which the first client device is a control device, the second client device is an input/output device, and the network device is a VIS device. It should be understood that, in this embodiment of this application, the control device may be alternatively connected to the input/output device by using a plurality of network devices, and two network devices are used as an example for description herein.

It should be noted that, as shown in FIG. 15, there is an FE interface between the control device (a PLC) and the VIS device and between the IO device and the VIS device. In this networking manner, the VIS device calculates an undetermined uplink delay and an undetermined downlink delay of each device, and transmits delay values to a VIS edge device. Finally, the VIS edge device performs asymmetric delay compensation at a service egress. Implementation steps are as follows. The following steps are described in a downlink direction.

It should be noted that, in this embodiment of this application, when the first network device is the first network device in the transmission direction of the first service flow, the first network device may be considered as a VIS device 1. When the first network device is not the first network device in the transmission direction of the first service flow, the first network device may be considered as a VIS device 2.

Step 1: After a service channel is established, the control device sends a first instruction for a service flow to a network device 1.

For example, after the service channel is established, the control device sends an asymmetric delay measurement and compensation command for the first service flow to the VIS device 1.

Step 2: When receiving the first instruction sent by the control device, the first network device sets a measurement code block in the first service flow.

For example, the VIS device 1 receives the command, executes a delay measurement code block insertion action, and inserts a measurement code block 0x1FF into a service flow of an FE.

Step 3: When writing the first service flow including the measurement code block into a cache, the first network device records a first moment; when a sending timeslot of the first service flow arrives, the first network device reads the first service flow from the cache; and the first network device records a second moment when the first switch device detects the measurement code block.

For example, the VIS device 1 inserts the delay measurement code block 0x1FF into the first service flow and then writes the first service flow into the cache, and records the first moment, and records the second moment when detecting the delay measurement code block in a downlink data flow.

Step 4: The first network device determines a downlink delay DIA of the first service flow in the first network device based on the first moment and the second moment.

It should be understood that, in the foregoing four steps, the first network device may be considered as the VIS device 1, in other words, the first network device is the first network device in the transmission direction of the first service flow. In other words, for a downlink, the first network device in the transmission direction of the first service flow is a network device connected to the control device.

Step 5: When the first network device is not the first network device in the transmission direction of the first service flow, for example, is the VIS device 2, the first network device receives the first service flow including the measurement code block, and records a third moment when the first network device detects the measurement code block.

For example, the VIS device 2 detects the measurement code block 0x1FF in the received first service flow, and records the third moment.

Step 6: When the first network device is not the first network device in the transmission direction of the first service flow, the first network device records a fourth moment when detecting the measurement code block in an egress service data flow.

For example, after parsing the first service flow the VIS device 2 saves the first service flow into a service egress cache, and records the fourth moment when reading the measurement code block 0x1FF from the cache.

Optionally, step 6 further includes: deleting, by the first network device, the measurement code block when recording the fourth moment.

Step 7: Determine an undetermined downlink delay DL2 of the first service flow in the VIS device 2 based on the third moment and the fourth moment.

It should be understood that, in step 5 to step 7, the first network device may be considered as the VIS device 2, in other words, the first network device is a network device other than the first network device in the transmission direction of the first service flow. In other words, for a downlink, the first network device in the transmission direction of the first service flow is an intermediate network device.

Step 8: For an uplink, repeat step 2 to step 7 to obtain an undetermined uplink delay UL1 and an undetermined uplink delay UL2 of the first service flow.

Step 9: Separately encode the undetermined uplink delay value and the undetermined downlink delay value into code groups, insert the code groups into an uplink service flow as padding code blocks, and transmit the uplink service flow to the control device.

For example, as shown in FIG. 13, in a code group, two 8B9B code blocks may be used as one group, and a first code block is a control code block, in other words, 0x155 may represent the control code block. A delay measurement value is transmitted in a subsequent control block. In other words, UL1 and DL2 may represent delay values. 0x0xx may represent a data code block.

Step 10: Through calculation and transmission, both the VIS device 1 and the VIS device 2 can obtain delay values DL DL2, UL1, and UL2 of all network devices. An asymmetric delay compensation cache is deployed on both a service egress of the VIS device 1 and a service egress of the VIS device 2.

For example, the VIS device 1 and the VIS device 2 perform calculation and compensation as follows:

If DL1+DL2>UL1+UL2, an uplink delay, to be specific, a read/write address of an asymmetric delay compensation cache of VIS device 1, needs to be increased, so that the uplink delay is increased by DL1+DL2−UL1−UL2. The VIS device 2 does not need to compensate for a delay.

If DL1+DL2<UL1+UL2, a downlink delay, to be specific, a read/write address of an asymmetric delay compensation cache of the VIS device 2, needs to be increased, so that the uplink delay is increased by DL1+DL2−UL1−UL2. The VIS device 1 does not need to compensate for a delay.

If DL1+DL2=UL1+UL2, an uplink delay, and a downlink delay are equal and symmetric, and neither the VIS device 1 nor the VIS device 2 needs to perform compensation.

It should be understood that, sequence numbers of the foregoing processes do not mean execution sequences. The execution sequences of the processes should be determined based on functions and internal logic of the processes, and should not be construed as any limitation on the implementation processes of the embodiments of this application. In the foregoing descriptions, the VIS device is used as an example for description. The network device in this embodiment of this application is not limited to the VIS device.

The delay measurement method, according to the embodiments of this application, is described in detail above. In this application, a network device may measure a delay value of a first service flow based on measurement of the first service flow, and compensate for time based on an obtained delay value in an uplink and a downlink, thereby reducing a time synchronization error. It should be understood that the network device in the embodiments of this application may perform the foregoing methods in the embodiments of this application. In other words, for specific working processes of the following products, refer to a corresponding process in the foregoing method embodiments.

Figure 16:
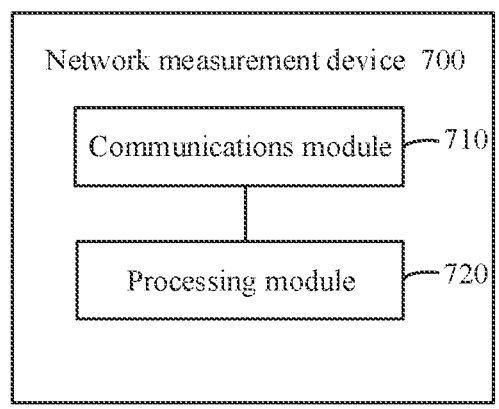
FIG. 16 is a schematic block diagram of a network device according to an embodiment of this application.

FIG. 16 is a schematic block diagram of a network device 700 according to an embodiment of this application. It should be understood that the network device 700 can perform steps performed by the first network device in the method embodiments. To avoid repetition, details are not described herein again. The network device 700 shown in FIG. 16 includes:

The network device 700 includes a communications module 710 and a processing module 720.

The communications module 710 is configured to receive a first service flow.

The processing module 720 is configured to determine a first delay value based on a first measurement code block in the first service flow, where the first delay value is a time difference between a first moment at which the measurement code block is detected in the first network device and a second moment at which the measurement code block is detected in the first network device.

In this embodiment of this application, a delay value of an entire service may be determined by using a delay value of a single measurement code block. Further, an edge network device or a client device performs time compensation for an error that is introduced to time synchronization because an uplink delay and a downlink delay are asymmetric. An uplink delay value and a downlink delay value are determined, and the uplink delay value and the downlink delay value are used to compensate for time, so that the problem that the uplink delay and the downlink delay are asymmetric is alleviated, thereby reducing a time synchronization error.

Optionally, the communications module 710 is further configured to receive a second service flow, where a transmission direction of the second service flow is opposite to a transmission direction of the first service flow, and the second service flow and the first service flow belong to a same service. The processing module 720 is further configured to determine a second delay value based on a second measurement code block in the second service flow.

Optionally, the communications module 710 is further configured to:

send at least one of the first delay value and the second delay value to the transmission direction of the first service flow or the transmission direction of the second service flow.

Optionally, the processing module 720 is specifically configured to: when the network device is a first network device in the transmission direction of the first service flow; set the first measurement code block in the first service flow; and determine the first delay value based on the first measurement code block.

Optionally, the processing module 720 is specifically configured to: when the first network device receives a first instruction, set the first measurement code block in the first service flow, where the first instruction is used to instruct to measure a delay value of the first service flow.

Optionally, the processing module 720 is specifically configured to: when the first network device is not a first network device in the transmission direction of the first service flow, receive, by using the communications module, the first service flow including the first measurement code block; and determine the first delay value based on the first measurement code block.

Optionally, the processing module 720 is further configured to: record the first moment when the first measurement code block is detected in the first service flow before the first service flow is written into a cache;

record the second moment when the first measurement code block is detected when the first service flow is read from the cache; and determine the first delay value based on the first moment and the second moment.

Optionally, the processing module 720 is further configured to delete the first measurement code block.

Optionally, the first measurement code block and the second measurement code block are coded blocks with identification information, the first measurement code block is carried in the first service flow, and the second measurement code block is carried in the second service flow.

Optionally, the processing module 720 is further configured to generate a first code group based on the first delay value and the second delay value, where the first code group includes information about an uplink-downlink identifier, information about the first delay value, and information about the second delay value, and the uplink-downlink identifier is used to indicate that the first delay value and the second delay value are respectively an uplink delay value and a downlink delay value.

Optionally, the first code group includes one or more coded blocks.

Optionally, the processing module 720 is further configured to: generate the first code group based on the first delay value and the second delay value, where the first code group includes a coded block with a first identifier, a coded block carrying the first delay value, a coded block with a second identifier, and a coded block carrying the second delay value, the coded block with the first identifier is used to indicate that the first delay value is an uplink delay value or a downlink delay value, and the coded block with the second identifier is used to indicate that the second delay value is an uplink delay value or a downlink delay value.

Optionally, the communications module 710 is further configured to:

send the first code group to a client device, where the first code group includes an uplink delay value and a downlink delay value; or send the first code group to an edge network device, where the first code group includes an uplink delay value and a downlink delay value, and the edge network device is a network device connected to the client device.

In this embodiment of this application, a delay value measurement method is provided. Specifically, the network device sets a measurement code block in a first service flow, a delay value of the first service flow in the network device is determined by determining a delay value of the measurement code block, and a determined uplink delay value and a determined downlink delay value are transmitted to an edge network device or a control device for time compensation, thereby reducing a time synchronization error.

A specific implementation of this embodiment of this application is described in more detail below with reference to specific examples. It should be noted that the example in the following descriptions is merely intended to help a person skilled in the art understand this embodiment of this application, rather than confining this embodiment of this application to a specific numerical value or a specific scenario shown in the example. A person skilled in the art can apparently make various equivalent modifications or changes based on the examples described above, and such modifications and changes also fall within the scope of the embodiments of this application.

Figure 17A:
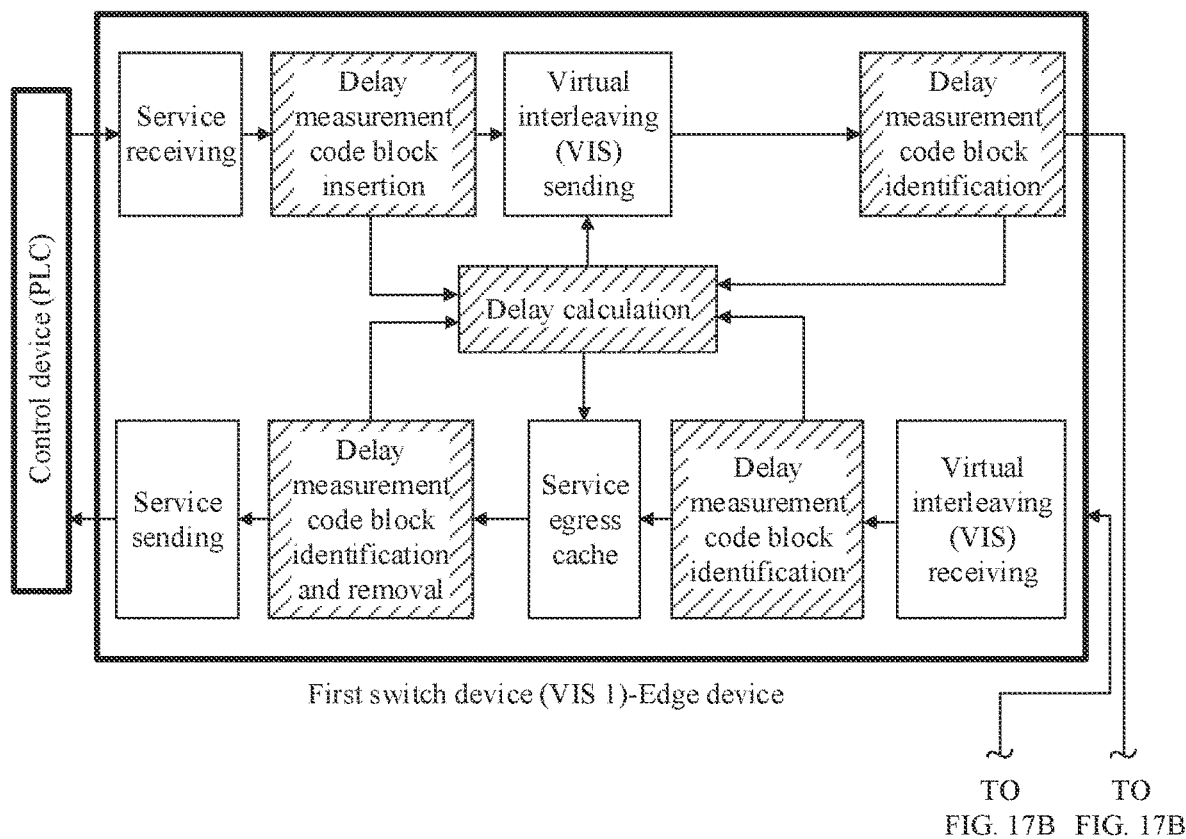
FIG. 17A, FIG. 17B, and FIG. 17C are a schematic block diagram of a network device according to another embodiment of this application.
Figure 17B:
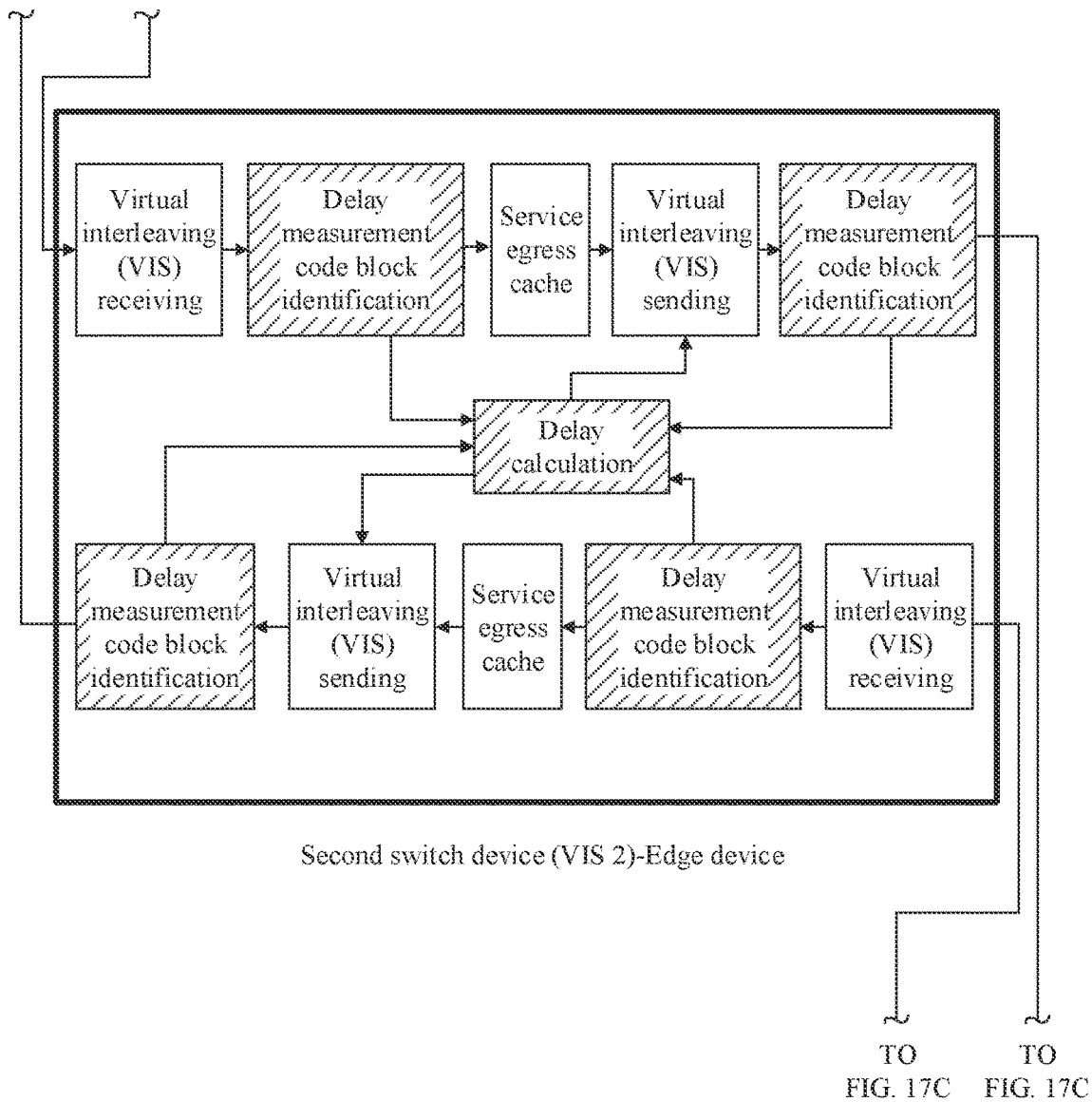
Figure 17C:
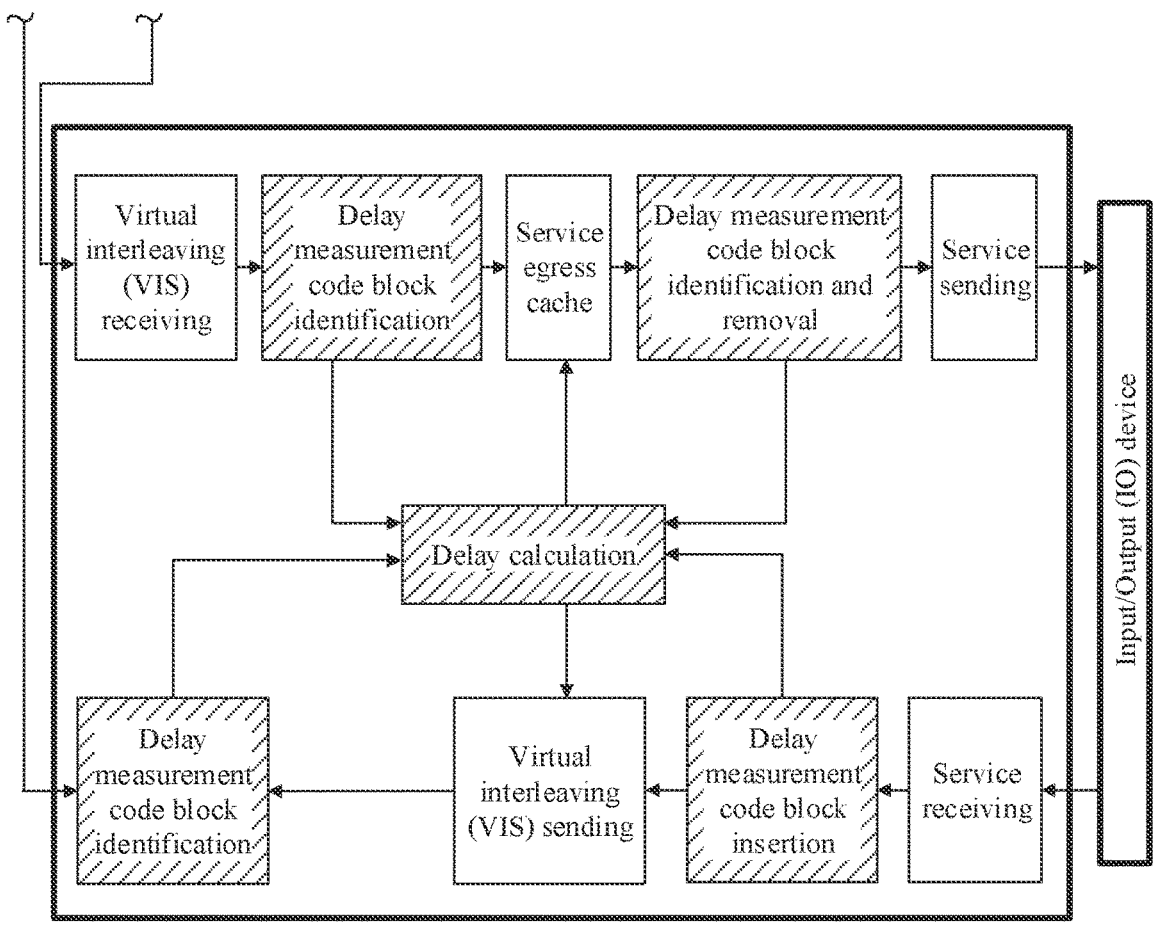

For example, in an industrial Ethernet, FIG. 17A, FIG. 17B, and FIG. 17C are a schematic diagram of a network device for measuring a delay according to an embodiment of this application. A first client device and a second client device may be connected by using three network devices.

It should be understood that, in this embodiment of this application, the first client device may be a control device, and the second client device may be an input/output device. The control device and the input/output device are connected by using a plurality of network devices, and three network devices are used as an example herein for description.

It should be noted that, this solution is implemented on a network device that supports a VIS interface, and a product form of the network device is an industrial switch device that supports the VIS interface. The following function modules need to be added to a service processing link: function modules identified by using shadow in FIG. 17A, FIG. 17B, and FIG. 17C. The function modules mainly include a measurement code block insertion module, a measurement code block identification module, a delay measurement code block removing module, a delay calculation module, and the like.

In this embodiment of this application, an edge network device may include a service receiving module, a measurement code block insertion module, a virtual interleaving sending module, a delay measurement identification module, a delay calculation module, a measurement code block identification module, a removing module, an egress buffering module, a virtual interleaving receiving module, and the like. Similarly, an intermediate network device includes same or corresponding modules as the edge network device, and is configured to perform the delay measurement method in the embodiments of this application.

An example in which the control device sends the first service flow (downlink) to the input/output device is used for description.

For the edge network device connected to the control device, after a service channel is established, the service receiving module in the edge network device receives a first service flow sent by the control device, and when the service receiving module receives an asymmetric delay measurement and compensation command sent by the control device to a VIS device 1 for a specific service flow, the measurement code block insertion module executes a measurement code block insertion action. A measurement code block 0x1FF may be inserted into a service flow of an FE, and the first service flow into which the measurement code block is inserted is written into a cache, and at the same time, an indication signal is sent to the delay calculation module, and a first moment is recorded. After the measurement code block 0x1FF is inserted, the delay measurement code block detection module detects the delay measurement code block in a downlink data flow. After the 0x1FF is detected, an indication signal is sent to the delay calculation unit, and a second moment is recorded. The delay calculation module calculates an undetermined downlink delay DL1 of the VIS device 1 based on moments at which the indication signal and the detection indication signal are respectively recorded.

For an intermediate network device, a VIS receiving module receives a first service flow sent by a VIS sending module of the edge network device, and the first service flow includes the measurement code block. After the measurement module 0x1FF is detected in a measurement code block identification module of the intermediate network device, an indication signal is sent to the delay calculation module, and a third moment is recorded. After a service is parsed, the service is saved into a service egress buffering module. The measurement code block 0x1FF is read from the service egress buffering module, an indication signal is sent to the delay calculation module, and a fourth moment is recorded. The intermediate network device calculates an undetermined downlink delay DL2 in the intermediate network device based on the moments at which the two indication signals are respectively recorded.

For a network device connected to an input/output device, a VIS receiving module receives a first service flow sent by a VIS sending module of the edge network device, and the first service flow includes the measurement code block. After the measurement module 0x1FF is detected in a measurement code block identification module of the intermediate network device, an indication signal is sent to the delay calculation module, and a fifth moment is recorded. After a service is parsed, the service is saved into a service egress buffering module. The measurement code block 0x1FF is read from the service egress buffering module, an indication signal is sent to the delay calculation module, a sixth moment is recorded, and the measurement code block is deleted at the same time. The network device calculates an undetermined downlink delay DL3 in the network device based on the moments at Which the two indication signals are respectively recorded.

Figure 18:
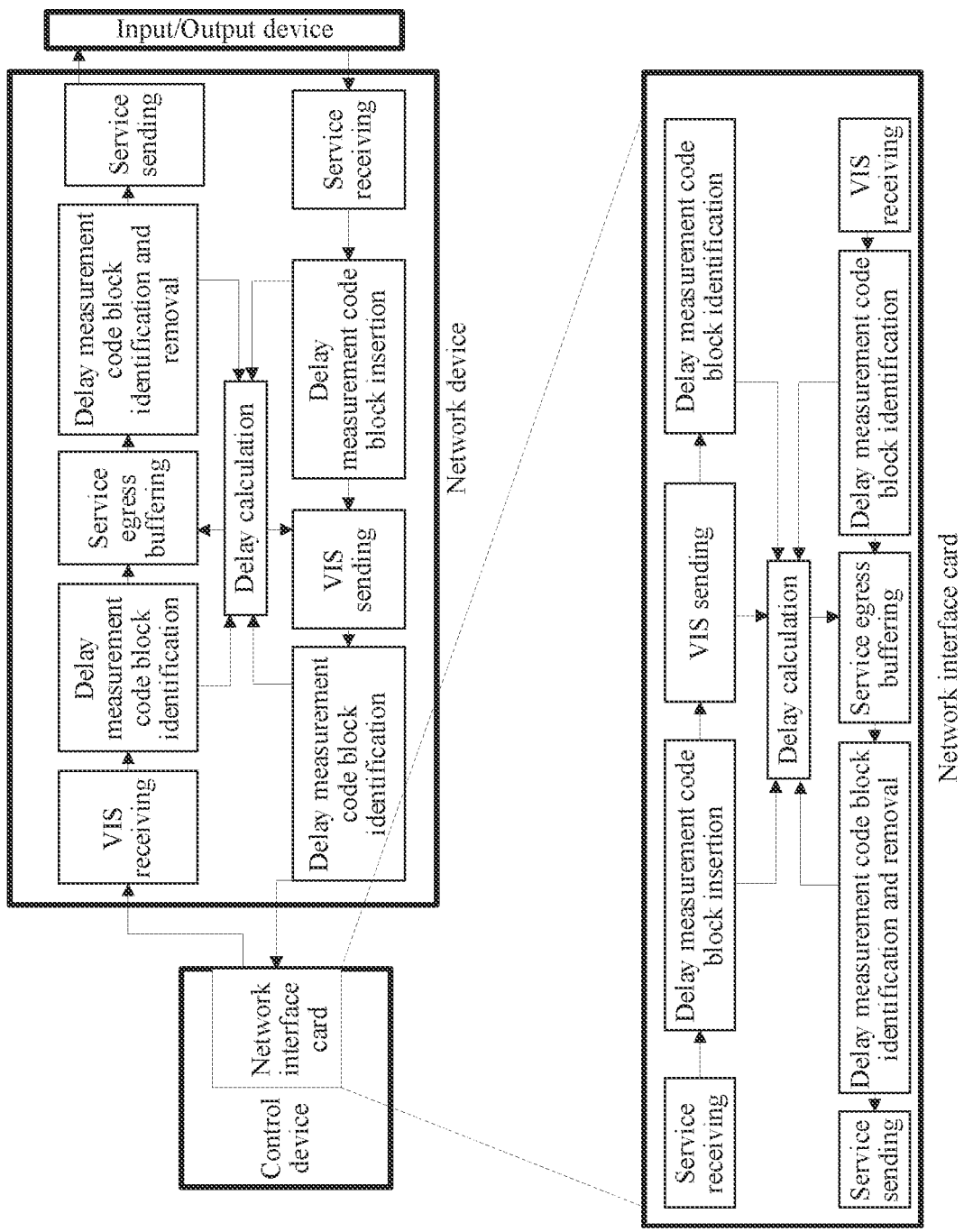
FIG. 18 is a schematic block diagram of a network device according to another embodiment of this application.

It should be noted that the foregoing networking manner may be alternatively shown in FIG. 18. In FIG. 18, the network device connected to the control device is integrated into the control device in a form of a network interface card. The control device needs to support a VIS interface, and another process is similar to that in FIG. 17A, FIG. 17B, and FIG. 17C, and details are not described herein again.

It should be noted that this embodiment of this application may be further applied to a flexible Ethernet, and the first network device is configured to connect the first client device and the second client device.

In this embodiment of this application, a delay value measurement method is provided. Specifically, the network device sets a measurement code block in a first service flow, a delay value of the first service flow in the network device is determined by determining a delay value of the measurement code block, and a determined uplink delay value and a determined downlink delay value are transmitted to an edge network device or a control device for time compensation, thereby reducing a time synchronization error.

Figure 19:
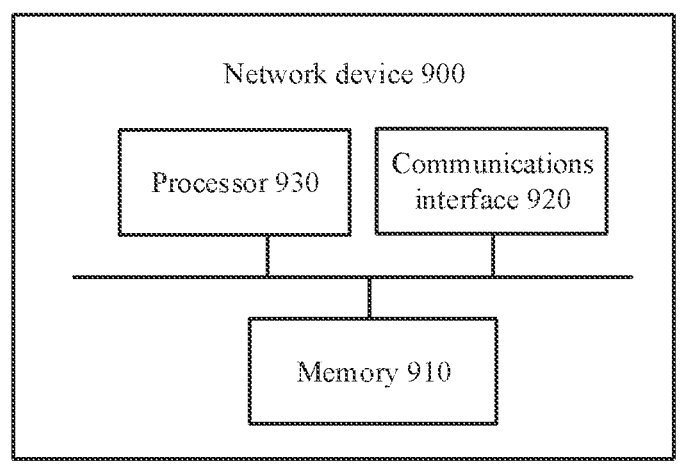
FIG. 19 is a schematic block diagram of a network device according to another embodiment of this application.

FIG. 19 is a schematic block diagram of a network device 900 according to an embodiment of this application. It should be understood that the network device 900 can perform steps performed by the first network device in the method embodiments. To avoid repetition, details are not described herein again. The network device 900 includes:

a memory 910, configured to store a program;

a communications interface 920, configured to receive a first service flow; and a processor 930, configured to execute the program in the memory 910, where when the program is executed, the processor 930 is configured to determine a first delay value based on a first measurement code block in the first service flow, where the first delay value is a time difference between a first moment at which the first measurement code block is detected in the first network device and a second moment at which the first measurement code block is detected in the first network device.

It should be noted that, in this embodiment of this application, the first network device may be configured to connect a first client device and a second client device, and the first client device and the second client device may be connected by using at least one network device.

Optionally, the communications interface 920 is further configured to receive a second service flow, where a transmission direction of the second service flow is opposite to a transmission direction of the first service flow, and the second service flow and the first service flow belong to a same service. The processor 930 is further configured to determine a second delay value based on a second measurement code block in the second service flow.

Optionally, the communications interface 920 is further configured to send the first delay value and the second delay value to the first client device or the second client device.

Optionally, the communications interface 920 is further configured to send at least one of the first delay value and the second delay value to the transmission direction of the first service flow or the transmission direction of the second service flow.

Optionally, the processor 930 is specifically configured to: when the network device is a first network device in the transmission direction of the first service flow, set the first measurement code block in the first service flow; and determine the first delay value based on the first measurement code block.

Optionally, the processor 930 is specifically configured to: when the first network device receives a first instruction, set the first measurement code block in the first service flow, where the first instruction is used to instruct to measure a delay value of the first service flow.

Optionally, the processor 930 is specifically configured to: when the first network device is not a first network device in the transmission direction of the first service flow, receive, by using the communications module, the first service flow including the first measurement code block, and determine the first delay value based on the first measurement code block.

Optionally, the processor 930 is further configured to: record the first moment when the first measurement code block is detected in the first service flow before the first service flow is written into a cache;

record the second moment when the first measurement code block is detected when the first service flow is read from the cache; and determine the first delay value based on the first moment and the second moment.

Optionally, the processor 930 is further configured to delete the first measurement code block.

Optionally, the first measurement code block and the second measurement code block are coded blocks with identification information, the first measurement code block is carried in the first service flow, and the second measurement code block is carried in the second service flow.

Optionally, the processor 930 is further configured to generate a first code group based on the first delay value and the second delay value, where the first code group includes information about an uplink-downlink identifier, information about the first delay value, and information about the second delay value, and the uplink-downlink identifier is used to indicate that the first delay value and the second delay value are respectively an uplink delay value and a downlink delay value.

Optionally, the first code group includes one or more coded blocks.

Optionally, the processor 930 is further configured to generate the first code group based on the first delay value and the second delay value, where the first code group includes a coded block with a first identifier, a coded block carrying the first delay value, a coded block with a second identifier, and a coded block carrying the second delay value, the coded block with the first identifier is used to indicate that the first delay value is an uplink delay value or a downlink delay value, and the coded block with the second identifier is used to indicate that the second delay value is an uplink delay value or a downlink delay value.

Optionally, the communications interface 920 is further configured to: send the first code group to a client device, where the first code group includes an uplink delay value and a downlink delay value; or send the first code group to an edge network device, where the first code group includes an uplink delay value and a downlink delay value, and the edge network device is a network device connected to a client device.

It should be understood that the network device shown in FIG. 19 may be a chip or a circuit, or another type of network device. For example, the chip or the circuit may be disposed in the network device. Further, the communications interface may be interchanged with a transceiver. The transceiver includes a receiver and a transmitter. Still further, the network device 900 may further include a bus system.

The processor 930, the memory 910, the receiver, and the transmitter are connected to each other by using the bus system. The processor 930 is configured to execute an instruction stored in the memory 910, to control the receiver to receive a signal, and control the transmitter to send a signal, thereby completing the steps of the network device in the communication method in this application. The receiver and the transmitter may be a same physical entity or different physical entities. When the receiver and the transmitter are a same physical entity, the receiver and the transmitter may be collectively referred to as a transceiver. The memory 910 may be integrated into the processor 930, or may be separated from the processor 930.

In an implementation, it may be considered that functions of the receiver and the transmitter are implemented by using a transceiver circuit or a dedicated transceiver chip. It may be considered that the processor 930 is implemented by a dedicated processing chip, a processing circuit, a processor, or a general-purpose chip.

In another implementation, it may be considered that the network device provided in this embodiment of this application is implemented by a general-purpose computer. To be specific, program code for implementing functions of the processor 930, the receiver, and the transmitter is stored in the memory, and a general-purpose processor implements the functions of the processor 930, the receiver, and the transmitter by executing the code in the memory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A delay measurement method, comprising:
   receiving, by a first network device, a first service flow;
   determining, by the first network device, a first delay value based on a first measurement code block in the first service flow, wherein the first delay value is a time difference between a first moment at which the first measurement code block is detected in the first network device and a second moment at which the first measurement code block is detected in the first network device;
   receiving, by the first network device, a second service flow, wherein a transmission direction of the second service flow is opposite to a transmission direction of the first service flow, and the second service flow and the first service flow belong to a same service; and
   determining, by the first network device, a second delay value based on a second measurement code block in the second service flow, wherein the second delay value is a time difference between a third moment at which the second measurement code block is detected in the first network device and a fourth moment at which the second measurement code block is detected in the first network device.

2. The method according to claim 1, wherein the method further comprises:
   sending, by the first network device, at least one of the first delay value and the second delay value to the transmission direction of the first service flow or the transmission direction of the second service flow.

3. The method according to claim 1, wherein the determining, by the first network device, a first delay value based on a first measurement code block in the first service flow comprises:
   when the first network device is a first network device in a transmission direction of the first service flow, setting, by the first network device, the first measurement code block in the first service flow; and determining, by the first network device, the first delay value based on the first measurement code block.

4. The method according to claim 3, wherein the setting, by the first network device, the first measurement code block in the first service flow comprises:

when the first network device receives a first instruction, setting, by the first network device, the first measurement code block in the first service flow, wherein the first instruction is used to instruct to measure a delay value of the first service flow.

5. The method according to claim 1, wherein the determining, by the first network device, a first delay value based on a first measurement code block in the first service flow comprises:

when the first network device is not a first network device in a transmission direction of the first service flow, receiving, by the first network device, the first service flow comprising the first measurement code block; and determining, by the first network device, the first delay value based on the first measurement code block.

6. The method according to claim 3, wherein the method further comprises:

recording, by the first network device, the first moment when the first network device detects the first measurement code block in the first service flow before writing the first service flow into a cache;

recording, by the first network device, the second moment when the first network device detects the first measurement code block when reading the first service flow from the cache; and determining, by the first network device, the first delay value based on the first moment and the second moment.

7. The method according to claim 6, wherein after the recording the second moment, the method further comprises:

deleting, by the first network device, the first measurement code block.

8. The method according to claim 1, wherein the first measurement code block and a second measurement code block are coded blocks with identification information, the first measurement code block is carried in the first service flow, and the second measurement code block is carried in a second service flow.

9. The method according to claim 1, wherein the method further comprises:

generating, by the first network device, a first code group based on the first delay value and the second delay value, wherein the first code group comprises information about an uplink-downlink identifier, information about the first delay value, and information about the second delay value, and wherein the uplink-downlink identifier is used to indicate that the first delay value and the second delay value are respectively an uplink delay value and a downlink delay value.

10. The method according to claim 9, wherein the first code group comprises one or more coded blocks.

11. The method according to claim 1, wherein the method further comprises:

generating, by the first network device, a first code group based on the first delay value and the second delay value, wherein the first code group comprises a coded block with a first identifier, a coded block carrying the first delay value, a coded block with a second identifier, and a coded block carrying the second delay value, and wherein the coded block with the first identifier is used to indicate that the first delay value is an uplink delay value or a downlink delay value, and the coded block with the second identifier is used to indicate that the second delay value is an uplink delay value or a downlink delay value.

12. The method according to claim 9, wherein the method further comprises:

sending, by the first network device, the first code group to a client device, wherein the first code group further comprises an uplink delay value and a downlink delay value; or sending, by the first network device, the first code group to an edge network device, wherein the first code group further comprises an uplink delay value and a downlink delay value, and the edge network device is a network device connected to a client device.

13. A network device, wherein the network device is a first network device and comprises:

at least one processor; and one or more memories coupled to the at least one processor and storing programming instructions for execution by the at least one processor, the programming instructions instruct the at least one processor to:

receive a first service flow;

determine a first delay value based on a first measurement code block in the first service flow, wherein the first delay value is a time difference between a first moment at which the first measurement code block is detected in the first network device and a second moment at which the first measurement code block is detected in the first network device;

receive a second service flow, wherein a transmission direction of the second service flow is opposite to a transmission direction of the first service flow, and the second service flow and the first service flow belong to a same service; and determine a second delay value based on a second measurement code block in the second service flow, wherein the second delay value is a time difference between a third moment at which the second measurement code block is detected in the first network device and a fourth moment at which the second measurement code block is detected in the first network device.

14. The network device according to claim 13, wherein the programming instructions further instruct the at least one processor to:

send at least one of the first delay value and the second delay value to the transmission direction of the first service flow or the transmission direction of the second service flow.

15. The network device according to claim 13, wherein the programming instructions further instruct the at least one processor to:

when the network device is a first network device in a transmission direction of the first service flow, set the first measurement code block in the first service flow; and determine the first delay value based on the first measurement code block.

16. The network device according to claim 15, wherein the programming instructions further instruct the at least one processor to:

when the network device receives a first instruction, set the first measurement code block in the first service flow, wherein the first instruction is used to instruct to measure a delay value of the first service flow.

17. The network device according to claim 13, wherein the programming instructions further instruct the at least one processor to:
when the first network device is not a first network device in a transmission direction of the first service flow, receive the first service flow comprising the first measurement code block; and
determine the first delay value based on the first measurement code block.

18. The network device according to claim 15, wherein the programming instructions further instruct the at least one processor to:
record the first moment when the first measurement code block is detected in the first service flow before the first service flow is written into a cache;
record the second moment when the first measurement code block is detected when the first service flow is read from the cache; and
determine the first delay value based on the first moment and the second moment.

19. A non-transitory computer-readable medium storing computer instructions that, when executed by one or more processors, cause a computer to perform operations comprising:
receiving, by a first network device, a first service flow;
determining, by the first network device, a first delay value based on a first measurement code block in the first service flow, wherein the first delay value is a time difference between a first moment at which the first measurement code block is detected in the first network device and a second moment at which the first measurement code block is detected in the first network device;
receiving, by the first network device, a second service flow, wherein a transmission direction of the second service flow is opposite to a transmission direction of the first service flow, and the second service flow and the first service flow belong to a same service; and
determining, by the first network device, a second delay value based on a second measurement code block in the second service flow, wherein the second delay value is a time difference between a third moment at which the second measurement code block is detected in the first network device and a fourth moment at which the second measurement code block is detected in the first network device.

20. The non-transitory computer-readable medium according to claim 19, wherein the operations further comprise:
sending, by the first network device, at least one of the first delay value and the second delay value to the transmission direction of the first service flow or the transmission direction of the second service flow.

* * * * *